(12) United States Patent
Kobayashi

(10) Patent No.: US 10,425,931 B2
(45) Date of Patent: Sep. 24, 2019

(54) BASE STATION, WIRELESS COMMUNICATION SYSTEM, AND BASE STATION PROCESSING METHOD

(71) Applicant: FUJITSU LIMITED, Kawasaki-shi, Kanagawa (JP)

(72) Inventor: Takaharu Kobayashi, Yamato (JP)

(73) Assignee: FUJITSU LIMITED, Kawasaki (JP)

( * ) Notice: Subject to any disclaimer, the term of this patent is extended or adjusted under 35 U.S.C. 154(b) by 303 days.

(21) Appl. No.: 15/085,760

(22) Filed: Mar. 30, 2016

(65) Prior Publication Data

US 2017/0238283 A1 Aug. 17, 2017

(30) Foreign Application Priority Data

Feb. 17, 2016 (JP) ................................ 2016-028136

(51) Int. Cl.
| | |
|---|---|
| *H04W 72/04* | (2009.01) |
| *H04W 8/02* | (2009.01) |
| *H04W 16/00* | (2009.01) |
| *H04W 88/08* | (2009.01) |

(52) U.S. Cl.
CPC ........... *H04W 72/042* (2013.01); *H04W 8/02* (2013.01); *H04W 16/00* (2013.01); *H04W 88/085* (2013.01)

(58) Field of Classification Search
CPC .......... H04L 41/0654; H04W 72/0406; H04W 24/02; H04W 8/26; H04W 92/20; H04W 48/08; H04W 8/02; H04W 16/00
USPC ....................................................... 370/329
See application file for complete search history.

(56) References Cited

U.S. PATENT DOCUMENTS

| | | | |
|---|---|---|---|
| 2011/0143812 A1* | 6/2011 | Ogawa | H04W 8/26 455/561 |
| 2012/0207043 A1* | 8/2012 | Geirhofer | H04L 5/0048 370/252 |
| 2013/0021986 A1* | 1/2013 | Bhattad | H04W 28/18 370/329 |
| 2013/0051240 A1* | 2/2013 | Bhattad | H04L 5/005 370/241 |
| 2013/0077569 A1* | 3/2013 | Nam | H04W 52/288 370/328 |
| 2013/0315195 A1 | 11/2013 | Ko et al. | |
| 2014/0092723 A1* | 4/2014 | Murphy | H04L 69/03 370/221 |
| 2015/0003362 A1* | 1/2015 | Inoue | H04L 5/0053 370/329 |
| 2015/0071187 A1* | 3/2015 | Chen | H04L 1/0026 370/329 |
| 2015/0087324 A1 | 3/2015 | Ishida et al. | |

(Continued)

FOREIGN PATENT DOCUMENTS

| | | |
|---|---|---|
| JP | 2014-505447 A | 2/2014 |
| JP | 2015-061248 A | 3/2015 |

OTHER PUBLICATIONS

Office Action from the Japanese Patent Office in counterpart application No. 2016-028136, dated Jul. 16, 2019.

*Primary Examiner* — Kevin D Mew
(74) *Attorney, Agent, or Firm* — Arent Fox LLP

(57) ABSTRACT

A base station includes a control unit that controls one or more identifiers to be installed on a plurality of transmission points in accordance with the number of control signals transmitted from the transmission points to one or more wireless terminals or the number of radio resources used to transmit the control signals to the one or more wireless terminals.

20 Claims, 23 Drawing Sheets

(56) References Cited

U.S. PATENT DOCUMENTS

| | | | |
|---|---|---|---|
| 2015/0117351 A1* | 4/2015 | Nagata | H04J 1/00 370/329 |
| 2015/0249961 A1* | 9/2015 | Wang | H04W 36/0083 370/329 |
| 2015/0341877 A1* | 11/2015 | Yi | H04W 56/00 370/350 |
| 2016/0014589 A1* | 1/2016 | Niu | H04W 74/02 370/329 |
| 2016/0037420 A1* | 2/2016 | Gaal | H04W 36/20 370/331 |
| 2016/0219475 A1* | 7/2016 | Kim | H04L 5/00 |
| 2017/0332192 A1* | 11/2017 | Edge | H04W 64/00 |

\* cited by examiner

FIG. 7

| TERMINAL | CONNECTED TP | SECONDARY TP |
|---|---|---|
| #1 | #a | — |
| #2 | #a | #b |
| #3 | #b | #a |
| #4 | #b | #a |
| #5 | #b | — |
| #6 | #b | — |
| #7 | #b | — |
| #8 | #c | #b |
| #9 | #c | #a |
| #10 | #a | #c |

FIG. 8A

| TP | $N_t$ |
|---|---|
| #a | 3 |
| #b | 5 |
| #c | 2 |

FIG. 8B

| DELAY SPREAD | L |
|---|---|
| a | 1 |
| b | 2 |
| c | 3 |
| d | 4 |
| e | 5 |
| f | 6 |

FIG. 8C

| TP | $Max_t$ |
|---|---|
| #a | c~d |
| #b | d~e |
| #c | c~d |

FIG. 8D

| TP | $L_t$ |
|---|---|
| #a | 3 |
| #b | 4 |
| #c | 3 |

FIG. 8E

| TP | $M_t$ |
|---|---|
| #a | 3 |
| #b | 4 |
| #c | 2 |

FIG. 11

| COMBINATION OF TPS | SUM OF $M_t$ AFTER MERGING OF CELLS |
|---|---|
| #a #b | 7 |
| #b #c | 6 |
| #c #a | 5 |
| #a #b #c | 10 |

FIG. 13

| TERMINAL | CELL OF CONNECTED TP | CELL OF SECONDARY TP |
|---|---|---|
| #1 | #a | — |
| #2 | #a | #b:#c |
| #3 | #b:#c | #a |
| #4 | #b:#c | #a |
| #5 | #b:#c | — |
| #6 | #b:#c | — |
| #7 | #b:#c | — |
| #8 | #b:#c | — |
| #9 | #b:#c | #a |
| #10 | #a | #b:#c |

FIG. 14

| COMBINATION OF TPS | SUM OF $M_t$ AFTER MERGING OF CELLS | NUMBER OF WIRELESS TERMINALS ON EDGE OF CELLS |
|---|---|---|
| #a  #b | 7 | 3 |
| #b  #c | 6 | 5 |
| #c  #a | 5 | 4 |
| #a  #b  #c | 10 | 0 |

BASE STATION, WIRELESS COMMUNICATION SYSTEM, AND BASE STATION PROCESSING METHOD

CROSS-REFERENCE TO RELATED APPLICATION

This application is based upon and claims the benefit of priority of the prior Japanese Patent application No. 2016-28136, filed on Feb. 17, 2016, the entire contents of which are incorporated herein by reference.

FIELD

The embodiments discussed herein are related to a base station, a wireless communication system, and a base station processing method.

BACKGROUND

The spread of smartphones and the like increases mobile traffic. In order to handle the increased traffic, the configuration is discussed to arrange many cells (hereinafter, sometimes referred to as a "small cells") in which less power is transmitted than in the macro cells in the past. Arranging a plurality of small cells, which use an identical frequency, allows for the handling of a larger amount of traffic by geographically reusing the radio resources. As a method for arranging the small cells, the configuration referred to as a Centralized Radio Access Network (C-RAN) is sometimes used. In the C-RAN, a radio resource scheduler and a signal processor are centralized in one or several places while a radio transmitter and a plurality of Remote Radio Heads (RRHs) having an antenna function are decentralized and arranged. The RRH is referred to as a transmission point hereinafter.

Patent Literature 1 Japanese Laid-open Patent Application No. 2015-61248

Patent Literature 2 Japanese National Publication of International Patent Application No. 2014-505447

The more the transmission points are arranged, the lager the amount of traffic can be handled. On the other hand, the more the transmission points are arranged, the larger the interference between the transmission points is adversely.

SUMMARY

According to an aspect of the embodiments, a base station includes a controller that controls one or more identifiers to be installed on a plurality of transmission points in accordance with the number of control signals transmitted from the transmission points to one or more wireless terminals or the number of radio resources used to transmit the control signals to the one or more wireless terminals.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram of exemplary serving transmission point and secondary transmission point of each wireless terminal in the example illustrated in FIG. 5;

FIG. 8A is a diagram of exemplary values ($N_t$) calculated based on the number of terminals connected to each transmission point in the example illustrated in FIG. 5;

FIG. 8B is a diagram of an exemplary data structure in which the information about the number of control signals is linked to the delay spread;

FIG. 8C is a diagram of exemplary delay spread at each transmission point in the example illustrated in FIG. 5;

FIG. 8D is a diagram of exemplary values ($L_t$) calculated based on the delay spread at each transmission point in the example illustrated in FIG. 5;

FIG. 8E is a diagram of exemplary values ($M_t$) of the number of control signals at each transmission point in the example illustrated in FIG. 5;

FIG. 11 is a diagram of exemplary results of calculation of the number of control signals when an identical identifier is installed on adjacent transmission points in the example illustrated in FIG. 5;

FIG. 13 is a diagram of serving transmission points and secondary transmission points connected to each wireless terminal in the example illustrated in FIG. 12;

FIG. 14 is an example in which a base station according to an embodiment calculates the number of wireless terminals located on the boundary between merged wireless areas and another wireless area (on the edges of the wireless areas) in addition to the calculation of $M_t$ at the transmission points of which wireless areas are integrated;

DESCRIPTION OF EMBODIMENTS

Hereinafter, embodiments will be described with reference to the appended drawings. Note that the identical or similar components are put with the identical reference signs.

Embodiments

Embodiments using Time Division Duplex-Long Term Evolution (TDD-LTE) as a communication standard are described hereinafter.

Figure 1:
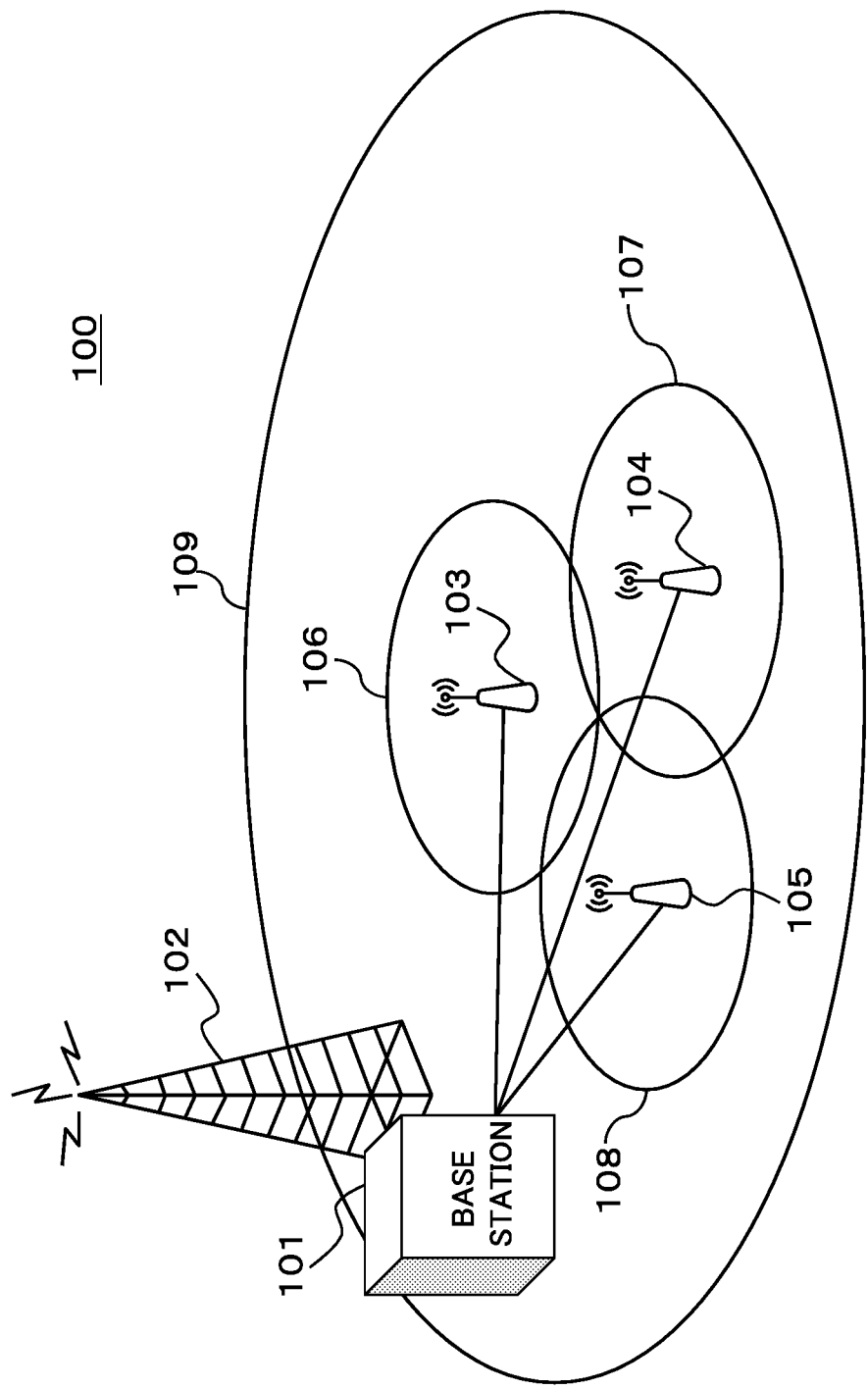
FIG. 1 is a diagram of the entire configuration of a communication system according to an embodiment.

FIG. 1 is a diagram of the entire configuration of a communication system 100 according to an embodiment. Transmission points 102 to 105 are connected to the base station 101. In order to connect the base station 101 and the transmission points 102 to 105, one or more of, for example, wired optical fiber communications or wireless microwave line communications are used. Each of the transmission points 102 to 105 forms a wireless area. In other words, one or more wireless terminals may be located in the wireless area formed by each of the transmission points 102 to 105. The wireless terminal can exchange radio signals with the TPs 102 to 105 forming the wireless area in which the wireless terminal is located.

The transmission point 102 among the transmission points 102 to 105 forms a large cell 109 as a wireless area. The "large cell" is sometimes referred to as a "macro cell." The transmission points 103 to 105 are arranged in the wireless area 109, and form small cells 106 to 108 as the wireless areas, respectively.

The "small cell" is an example of a cell having a smaller range (coverage) in which electric waves reach than the macro cell. The small cell may differently be referred to depending on the coverage area. The small cell may be referred to, for example, as a "femtocell," a "picocell," a "macrocell," a "nanocell," a "metrocell," or a "homecell."

The base station 101 is connected to the transmission points 102 to 105 and also connected to a core network (not illustrated) so as to relay the communication between the core network and one or more wireless terminals located in the wireless areas of the transmission points 102 to 105. The base station 101 controls the communication between the transmission points 102 to 105 and one or more wireless terminals located in any one of the wireless areas of the transmission points 102 to 105 in accordance with the control signal from the core network. Alternatively, the base station 101 may autonomously control the communication between the transmission points 102 to 105 and one or more wireless terminals located in any one of the wireless areas of the transmission points 102 to 105 without depending on the control signal from the core network.

The base station 101 includes an interface with the core network and a baseband unit for the communication with the transmission points 102 to 105 and one or more wireless terminals located in any one of the wireless areas of the transmission points 102 to 105. Each of the transmission points 102 to 105 includes a wireless unit so as to convert a baseband signal generated by the baseband unit of the base station 101 into a radio signal and transmit the radio signal to the wireless terminals. The transmission points 102 to 105 can also receive the radio signal from the wireless terminal and convert the received radio signal into a baseband signal, and then transmit the baseband signal to the base station 101.

Arranging many transmission points as described above allows for the handling of a large amount of traffic in a wireless area. On the other hand, such arrangement may increase the interference between the transmission points (namely, between the wireless areas). An inter-cell interference coordination technology (Coordinated Multipoint operation (CoMP)) is discussed as an efficient technology for the problem of interference in the Long Term Evolution (LTE) standard.

Using CoMP may improve the quality of data transmission and reception by performing Dynamic Point Selection (DPS) in which data is temporarily transmitted not from the serving cell but from the cell adjacent to the serving cell. Alternatively, using CoMP may improve the quality of data reception by performing Joint Transmission (JT) in which the data is simultaneously transmitted from the serving cell and the cell adjacent to the serving cell. In order to be compatible with a different data transmission scheme, for example, a Channel State Information (CSI) reference signal used to measure the reference signals that may individually be set to each user and to measure the interference is standardized in the LTE. On the other hand, it is difficult to use the inter-cell coordination technology because the wireless terminal receives the control signal notifying, for example, the information about the data signal allocation based on the Cell-specific Reference Signal (CRS).

Figure 2:
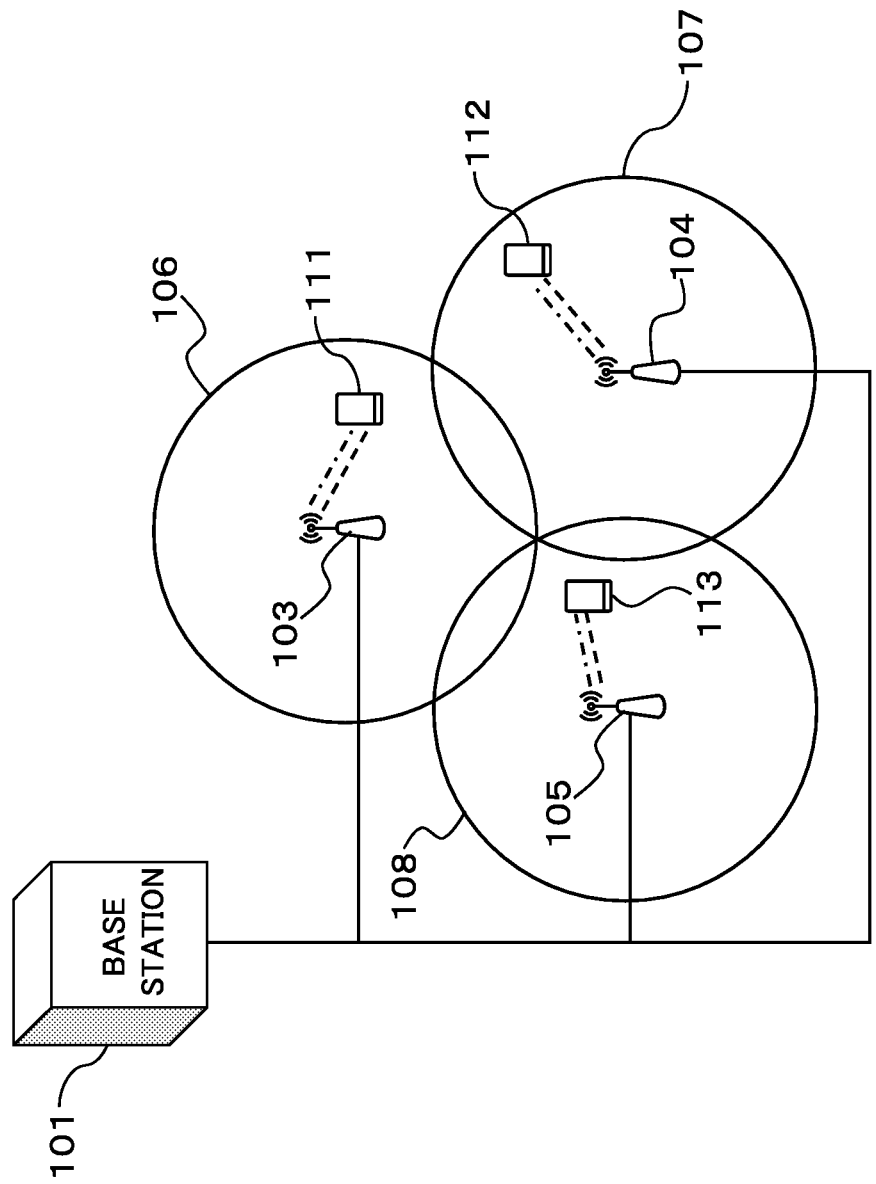
FIG. 2 is a diagram of the entire configuration of a wireless communication system in which different identifiers are installed on the transmission points.

Thus, the interference of the control signals adversely remains in a wireless communication system in which different identifiers (that can be referred to as "cell IDs (IDentifires)") are installed on TPs as illustrated in FIG. 2 (hereinafter, referred to as a "individual cell ID scheme system"). The interference of control signals occurs, for example, when a wireless terminal is located both of in the small cell 106 and in the small cell 107 (hereinafter, referred to as "when a wireless terminal is located on the edges of small cells" or "when a wireless terminal is located on the boundary of small cells"). The dotted lines in FIG. 2 indicate that the link for user data such as a Physical Downlink Shared Channel (PDSCH) is established. Similarly, the alternate long and short dash lines indicate that the link for a control signal such as a Physical Downlink Control Channel (PDCCH). In other words, a wireless terminal 111, a wireless terminal 112, and a wireless terminal 113 are located in the wireless areas of the transmission points 103 to 105, respectively, and receive the user data or control signal from the base station 101. Note that, in order to simplify the description, the description has focused on the small cell and the description of the transmission point 102 and the large cell 109 has been omitted (the description of the transmission point 102 and the large cell 109 will be omitted also below).

The small cell 106, the small cell 107, and the small cell 108 are adjacent to each other. When the transmission points 103 to 105 transmit the user data and control signal with an identical frequency band, the interference occurs among the small cell 106, the small cell 107, and the small cell 108.

Figure 3:
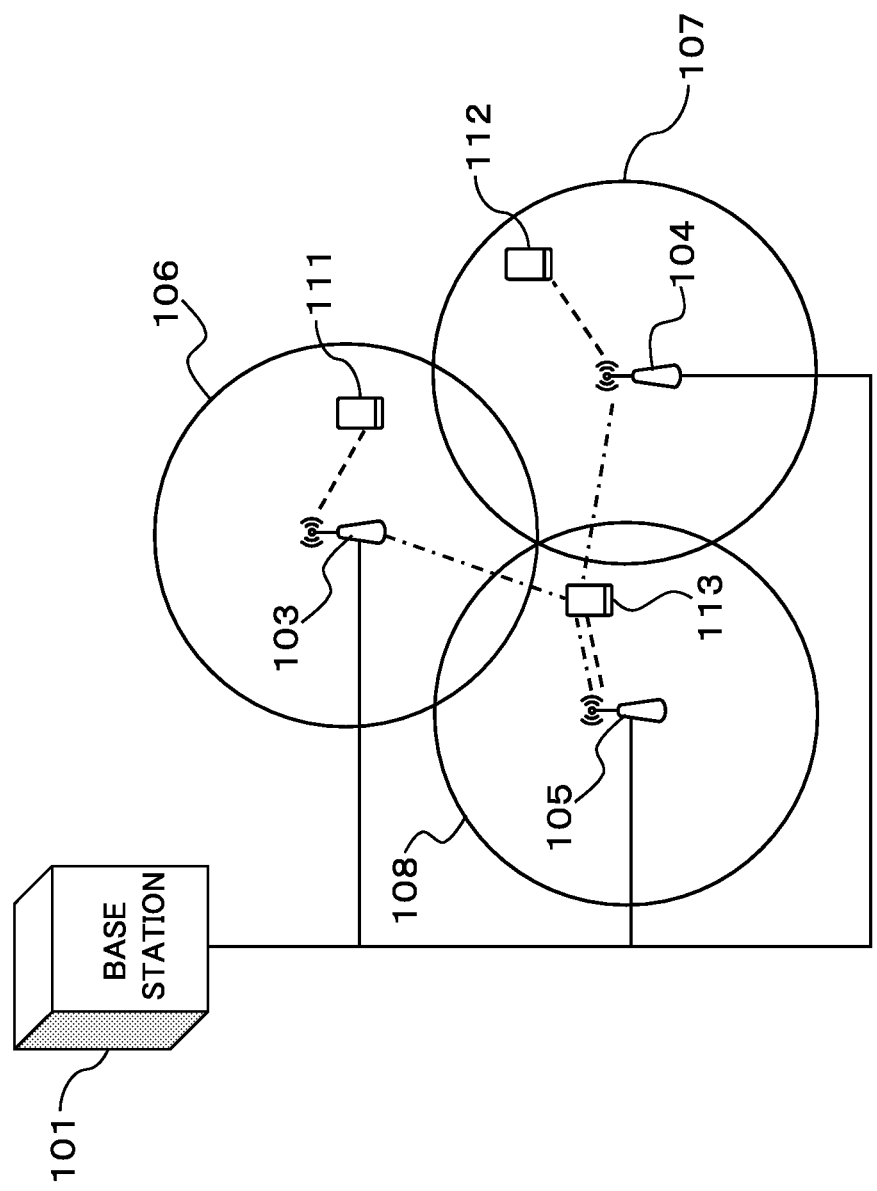
FIG. 3 is a diagram of the entire configuration of a wireless communication system in which an identical identifier is installed on the transmission points.

There is an identical cell ID scheme illustrated in FIG. 3 as a technology to resolve the interference. The identical cell ID scheme allows the prevention of the interference of the control signals among the cells by installing an identical cell ID on the adjacent transmission points and simultaneously transmitting CRS and the control signal using the CRS from a plurality of wireless areas. Note that the cell ID installed on a transmission point is sometimes used as the ID of the cell formed by the transmission point hereinafter.

In other words, an identical cell ID is installed on the transmission points 103 to 105 in FIG. 3. This installation causes, for example, the wireless terminal 113 to receive the identical control signal from the transmission points 103 and 104 in addition to from the transmission point 105 as indicated by the alternate long and short dash lines. Although not illustrated, the other wireless terminal 111 and wireless terminal 112 also receive the identical control signal in a similar manner. Thus, when the data in PDSCH is received in a small cell, the data in PDCCH is also received in the small cell in the individual cell ID scheme system. On the other hand, when the data in PDSCH is received in a small cell, the data in PDCCH is received in many small cells in the identical cell ID scheme. In other words, the data in PDCCH is received in a plurality of small cells on which an identical cell ID is installed while the data in PDSCH is received individually in a small cell in the identical cell ID scheme. In the identical cell ID scheme, an area with a good reception quality to receive the data in PDCCH is formed so that the area includes the individual small cells.

However, an identical control signal is transmitted from a plurality of transmission points in the identical cell ID scheme. Thus, more radio resources are used to transmit the control signals in the identical cell ID scheme in comparison with in the individual cell ID scheme. Since, for example, the operation in which an identical cell ID is installed on two transmission points increases the number of wireless terminals per cell ID compared to the operation in which the individual cell IDs are installed on the transmission points, the operation in the identical cell ID scheme may be equivalent to the fact that the radio resources are used twice as many as the radio resources in the individual cell ID scheme. This may halve the number of multiplexed control signals per unit area of a wireless area. Thus, when an identical cell ID is installed on the transmission points 103 to 105 as illustrated in FIG. 3, the number of multiplexed control signals per unit area of a wireless area can be one third as many as the number of multiplexed control signals in FIG. 2. This is because an identical control signal is simultaneously transmitted from a plurality of transmission points in the identical cell ID scheme as described above.

In other words, using the identical cell ID scheme prevents the interference of the control signals. However, using the identical cell ID scheme may be a cause for concern about the degrade in characteristics due to the decrease in the upper limit of the number of multiplexed control signals in an attempt to multiplex communications with many wireless terminals at each transmission point. Thus, the operation is preferably selected from the operations in the identical cell ID scheme and in the individual cell ID scheme not uniformly but depending on the conditions. In other words, the operation is preferably selected dynamically from the operations in the identical cell ID scheme and in the individual cell ID scheme, not fixed to one of the operations in the identical cell ID scheme and in the individual cell ID scheme.

Figure 4:
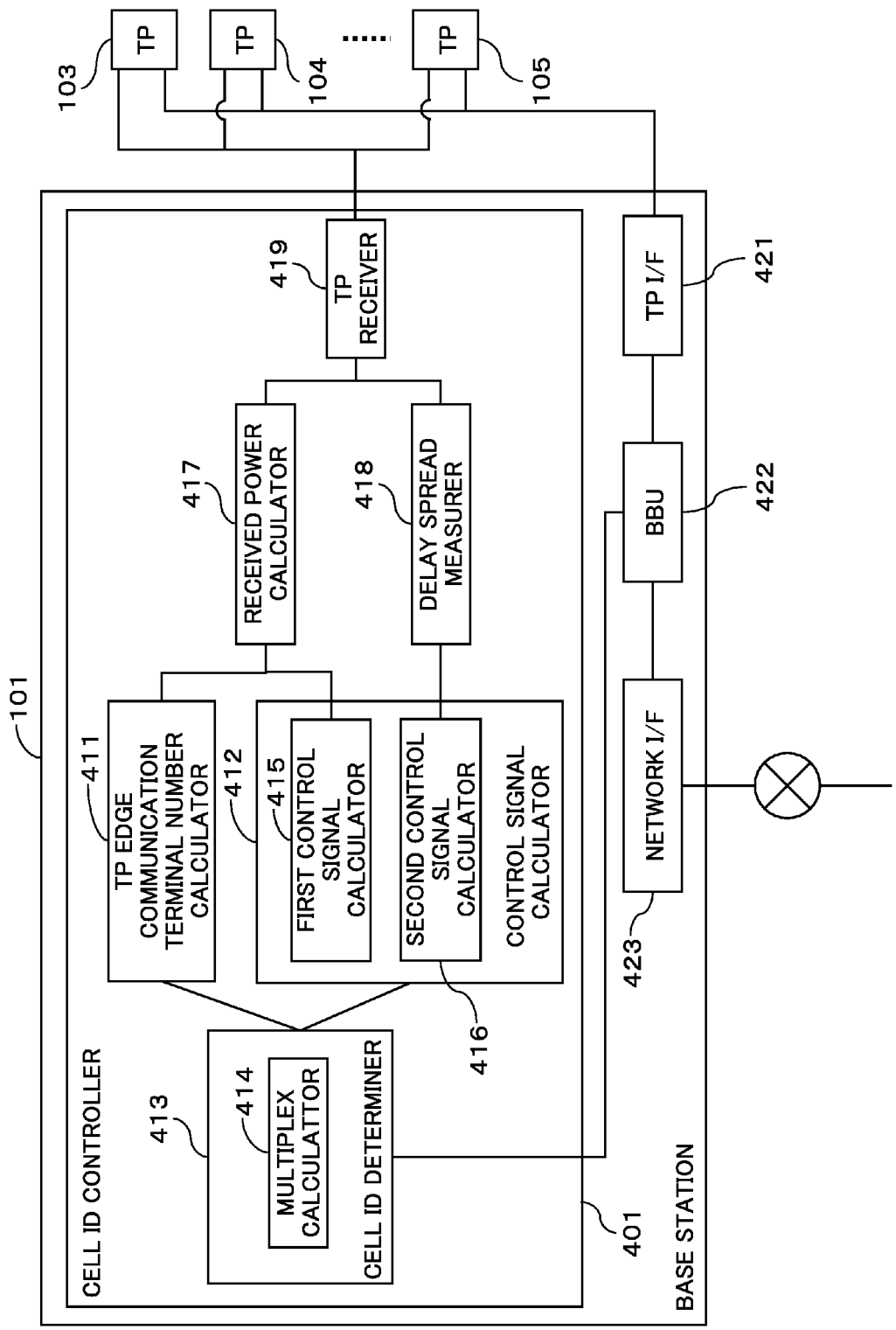
FIG. 4 is a functional block diagram of a base station according to an embodiment.

FIG. 4 is a functional block diagram of the base station 101 according to an embodiment. The base station 101 is connected to the transmission point 103, a transmission point 104, and a transmission point 105. Hereinafter, each transmission point is referred to as a TP (Transmission Point), and a wireless area formed by each transmission point is referred to as a "cell of a transmission point." Cell IDs installed on the TP 103, TP 104, and TP 105 are referred to as #a, #b, and #c, respectively. The TP 103 may be referred to as a "TP of #a", the TP 104 may be referred to as a "TP of #b", and the TP 105 may be referred to as a "TP of #c."

The base station 101 includes a network Interface (I/F) 423, a Base Band Unit (BBU) 422, a TP I/F 421, and a cell ID controller 401.

The network I/F 423 is used to connect the base station 101 to the core network. The network I/F 423 outputs the user data and control signal received from the core network to the BBU 422, and transmits the user data and control signal input from the BBU 422 to the core network.

The BBU 422 performs a base band process in order to transmit the user data and control signal input from the network I/F 423 to the TPs 103 to 105 and the wireless terminals located in the cells of the TPs 103 to 105. The BBU 422 processes a signal in order to convert and transmit the baseband signal received from TPs 103 to 105 and the wireless terminals located in the cells of TPs 103 to 105 to the core network.

The TP I/F 421 is used to connect the base station 101 to the TPs 103 to 105. The TP I/F 421 outputs the baseband signal received from each of the TPs 103 to 105 to the BBU 422, and outputs the baseband signal input from the BBU 422 to the TPs 103 to 105.

The cell ID controller 401 controls the cell ID to be installed on the TPs 103 to 105. The control is performed in accordance with the number of control signals transmitted from the TPs 103 to 105 to one or more wireless terminals or the number of radio resources used to transmit the control signals to the one or more wireless terminals. For example, the cell ID controller 401 controls the cell ID to be installed on the TPs 103 to 105 in accordance with one or more of the number of wireless terminals located in the cell of each of the TPs 103 to 105, the state of the transmission channel (for example, the amount of the delay spread), and whether the one or more wireless terminals are located on the edges of the cells. For example, in order to install an identical cell ID on the cells of the TP 103 and TP 104, the cell ID controller 401 controls, for example, the BBU 422 to transmit an identical baseband signal to the TP 103 and TP 104.

The cell ID controller 401 includes a cell ID determiner 413. The cell ID controller 401 further includes a control signal calculator 412. The cell ID controller 401 can include a TP edge communication terminal number calculator 411. The cell ID controller 401 may further include a received power calculator 417, a delay spread measurer 418, and a TP receiver 419.

The cell ID determiner 413 determines a cell ID to be installed on each of the TPs 103 to 105. The cell ID determiner 413 determines the cell ID in accordance with the output from the control signal calculator 412 or in accordance with the output from the TP edge communication terminal number calculator 411 when necessary. The control signal calculator 412 outputs the information about the number of wireless terminals and the state of the transmission channel. The TP edge communication terminal number calculator 411 outputs the information indicating whether the one or more wireless terminals are located on the edges of the cells. Thus, the cell ID determiner 413 determines a cell ID to be installed on each of the TPs 103 to 105 in accordance with one or more of the number of wireless terminals, the state of the transmission channel (for example, the amount of the delay spread), and whether the one or more wireless terminals are located on the edges of the cells.

The control signal calculator 412 calculates the information about the number of control signals transmitted to the one or more wireless terminals located in each of the TPs 103 to 105, or about the number of radio resources used to transmit the control signals to the one or more wireless terminals. The number of control signals may be proportional to the amount of information about the control signals transmitted to the one or more wireless terminals per unit time. In other words, the number of control signals may be proportional to the number of radio resources used to transmit the control signals to the one or more wireless terminals per unit time. In other words, the number of control signals may be proportional to the multiplex of the control signals simultaneously transmitted to the one or more wireless terminals. More specifically, the control signal calculator 412 may calculate the maximum value of the number of control signals transmitted to the one or more wireless terminals located in each of the TPs 103 to 105 per unit time or the maximum value of the number of radio resources used to transmit the control signals to the one or more wireless terminals. The information about the number of the control signals or about the number of radio resources used to transmit the control signals to the one or more wireless terminals may be calculated in accordance with the number of wireless terminals connected to or served by the TPs 103 to 105 or the delay spread at the TP of the cell in which the wireless terminals are located.

For example, the received power of the received signals that a wireless terminal receives from all or some of the TPs 103 to 105 is calculated and the TP that transmits the received signal with the maximum received power may be determined. This may determine which cell the wireless terminal is located and which TP the wireless terminal is connected to. Thus, the control signal calculator 412 may include a first control signal calculator 415 in order to determine the TP that transmits the received signal with the maximum received power to each of the wireless terminals.

The first control signal calculator 415 determines to which TP each wireless terminal is connected in accordance with the result of the calculation of the received power of the signal received from each TP.

The first control signal calculator 415 may calculate the received power of the signal that each wireless terminal receives from each TP in accordance with the result of reception by the TP receiver 419 in order to determine to which TP each wireless terminal is connected. Specifically, the received power calculator 417 collects, from each TP, the information about the transmission power from the TP and the received power when the TP receives the signal transmitted from a wireless terminal. The received power calculator 417 collects the information about the transmission power from each wireless terminal through the TP. The value of transmission power of a TP #j is denoted by $P_{TP, j}$. The value of received power when the TP #j receives the transmitted power from a wireless terminal #i is denoted by $R_{UL, i, j}$. The value of transmission power of the wireless terminal #i is denoted by $P_{UE, i}$. In this case, the received power calculator 417 may estimate the received power value $R_{DL, i, j}$ when the wireless terminal #i receives the transmitted signal from the TP #j, using the following expression.

$$R_{DL,i,j} = R_{UL,i,j} - P_{UE,i} + P_{TP,j}$$

Thus, the first control signal calculator 415 may determine the TP #j of the cell in which the wireless terminal #i is located by $\mathrm{argmax}_j(R_{DL, i, j})$.

Note that the TP #j is referred to as a "serving TP" of the wireless terminal #i, and it is indicated that "the wireless terminal #i is served by the TP #j".

The delay spread is measured per wireless terminal. The delay spread at a TP may be a value calculated from the measured delay spread of a signal transmitted from the wireless terminal served by the TP. The delay spread of a TP may be the result of calculation of the average value or maximum value of the delay spreads of signals transmitted from the wireless terminals served by the TP. Thus, the control signal calculator 412 may include a second control signal calculator 416. The second control signal calculator 416 calculates the delay spread per TP.

The delay spread measurer 418 measures the delay spread of the one or more wireless terminals served by each TP in accordance with the signal that the TP receiver 419 receives from each TP so that the second control signal calculator 416 can calculate the delay spread per TP.

The TP edge communication terminal number calculator 411 measures the number of wireless terminals located on the edge of the cell of each TP. In other words, the TP edge communication terminal number calculator 411 measures the number of wireless terminals that are located both of in the cell formed by a TP and in the cell formed by another TP. Such a wireless terminal is measured when the wireless terminal is located in the overlapped cell areas generated by the adjacent TPs. The received power of the signal that the wireless terminal receives from each TP is measured or estimated, and it is determined whether the difference of the received powers of the signal received from a plurality of TPs is smaller than a threshold. This may determine whether a wireless terminal is located on a TP edge.

When the TP serving the wireless terminal #i is TP #j, TH denotes a predetermined value, a TP #k that satisfies $$R_{DL,i,j} - R_{DL,1,k} < TH \qquad \text{(expression 1)}$$

with the $R_{DL, i, j}$ and $R_{DL, i, k}$ calculated by the received power calculator 417 exists, the TP edge communication terminal number calculator 411 may determine that the wireless terminal #i is located on the edge of the cell of the TP. The TP #j is sometimes referred to as a "primary TP" of the wireless terminal #i, and the TP #k is sometimes referred to as a "secondary TP" of the wireless terminal #i.

The operation of the cell ID controller 401 in the base station 101 will be described hereinafter with reference to the drawings and with specific examples.

Figure 5:
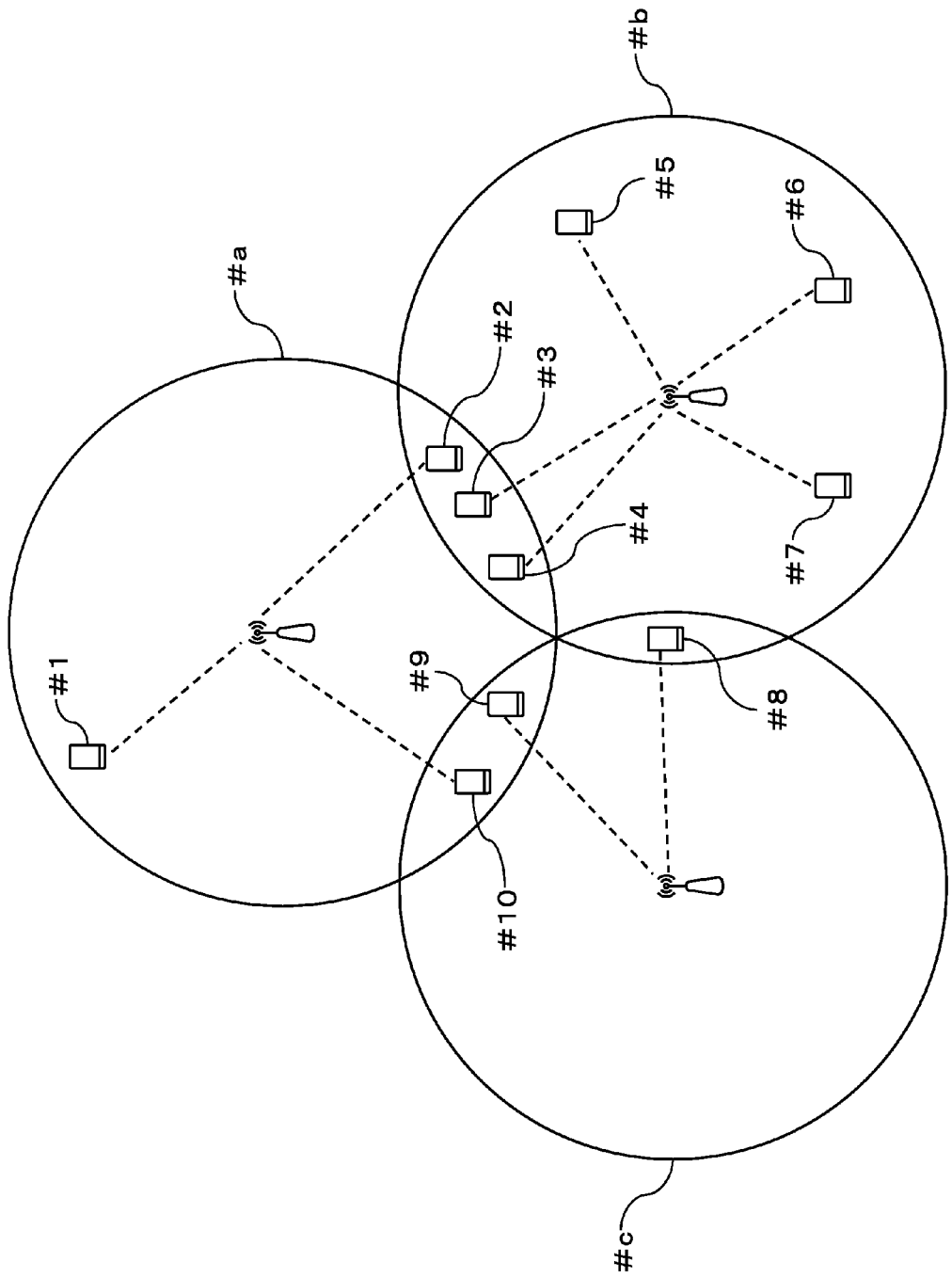
FIG. 5 is a diagram of exemplary arrangement (distribution) of wireless terminals in a wireless area.

FIG. 5 illustrates an exemplary distribution of wireless terminals in a cell #a, a cell #b, and a cell #c as a specific example used for the description. In FIG. 5, the TPs and the wireless terminals served by the TPs are connected with dotted lines. Furthermore, the wireless terminals that are located in at least two or more circles of a plurality of cells means that the wireless terminals are located in the edges of the cells.

In other words, the wireless terminal #1, the wireless terminal #2, and the wireless terminal #10 are located in the cell #a. The wireless terminal #3, the wireless terminal #4, and the wireless terminal #5, the wireless terminal #6, and the wireless terminal #7 are located in the cell #b. The wireless terminal #8 and the wireless terminal #9 are located in the cell #c. The wireless terminal #2, the wireless terminal #3, and the wireless terminal #4 are located both of in the cell #a and in the cell #b, and thus are located both of on the edge of the cell #a and on the edge of the cell #b. Similarly, the wireless terminal #8 is located on the edge of the cell #b and on the edge of the cell #c. The wireless terminal #9 and the wireless terminal #10 are located both of on the edge of the cell #c and on the edge of the cell #a.

Figure 6:
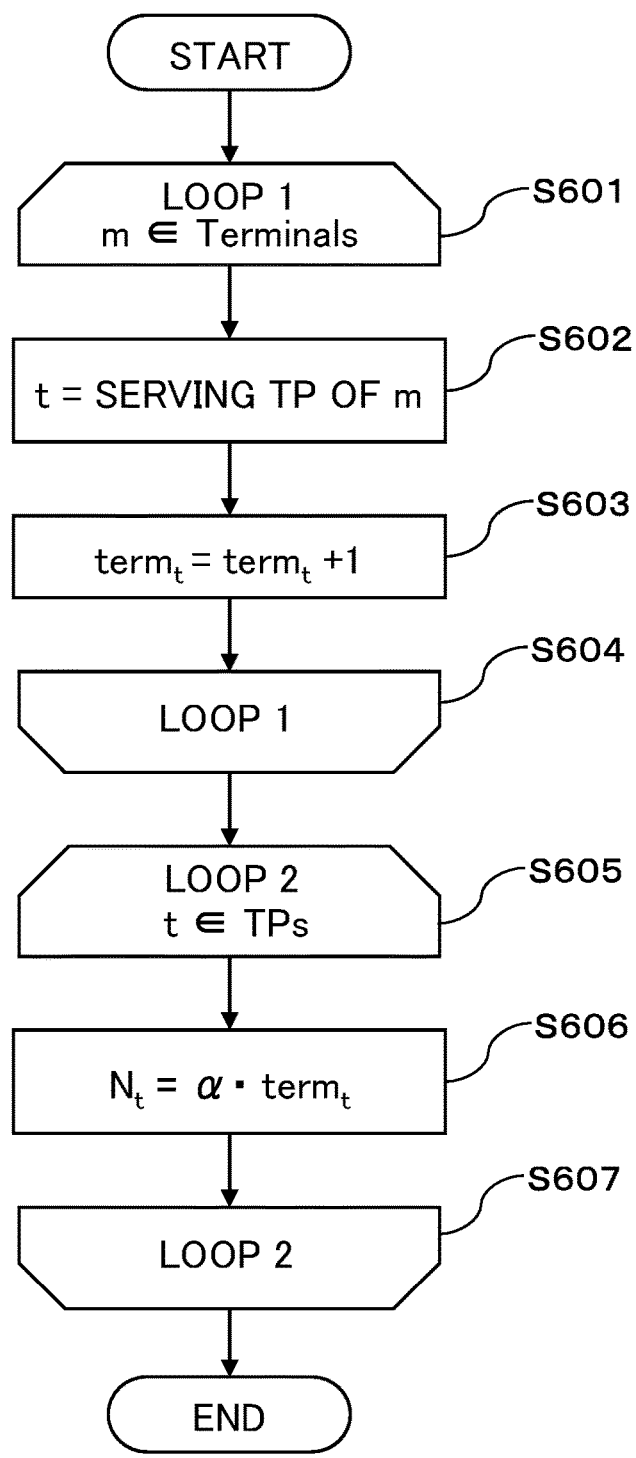
FIG. 6 is a flowchart of a process in which a base station according to an embodiment calculates the number of control signals per transmission point.

FIG. 6 is a flowchart of a process for calculating the number of control signals per TP or the number of radio resources used to transmit the control signals to one or more wireless terminals by determining the serving TP of each of the wireless terminals, and calculating the number of wireless terminals served by each TP. The process of the flowchart illustrated in FIG. 6 is performed with the control signal calculator 412 and the cell ID determiner 413. More specifically, the process of the flowchart illustrated in FIG. 6 is performed with the first control signal calculator 415 and the multiplex calculator 414.

When arbitrary one of TPs connected to the base station 101 is denoted by t, $term_t$ is the variable ranging the number of wireless terminals of which serving TP is t. Furthermore, $N_t$ is the variable ranging the number of control signals calculated based on the number of wireless terminals of which serving TP is t or the number of radio resources used to transmit the control signals to the wireless terminals. Note that the variables $term_t$ and $N_t$ are initialized to zero before the process of the flowchart illustrated in FIG. 6 is performed. A set of wireless terminals of which serving TPs are TPs connected to the base station 101 is referred to as "Terminals".

The process in steps S601 to step S604 in the flowchart of FIG. 6 is a loop for the wireless terminals that is the elements of the set Terminals. In other words, the serving TP of each of the wireless terminals that is the elements of the Terminals is determined in step S602, the identifier of the TP is substituted for the variable t. The received power calculator 417 calculates the received power value of Sounding Reference Signal (SRS) from the wireless terminals at each TP in a small cell. This calculation may determine the TP with the highest received power as the serving TP of a wireless terminal as described above. In step S603, the value of the variable $term_t$ is increased by one. Specifically, the process in step S602 is performed with the first control signal calculator 415 of the control signal calculator 412.

The serving TPs of the wireless terminals #1 to #10 in FIG. 5 are the values in the column of the "serving TP" corresponding to the values of the column of the "Terminal" illustrated in FIG. 7. Thus, when the process in steps S601 to S604 is completed, $term_{\#a}=3$,
$term_{\#b}=5$, and
$term_{\#c}=2$ hold.

Note that the column of the "secondary TP" in the example illustrated in FIG. 7 ranges the identifiers of the secondary TPs (TP #k of $R_{DL, i, k}$ in the expression 1) when the wireless terminal is located on a TP edge. The TP edge communication terminal number calculator 411 calculates the number of wireless terminals on the edge of the TP when necessary. This calculation may determine whether each wireless terminal has a secondary TP, and determine the identifier of the secondary TP when the wireless terminal has the secondary TP.

When the set of TPs connected to the base station 101 is referred to as "TPs", the process in steps S605 to S607 is a loop for the elements of the TPs. In other words, the elements of TPs are sequentially substituted for the variable t with the progress of the loops. The value obtained by multiplying the value of $term_t$ by a predetermined coefficient α is substituted for each value of the variable t to the variable $N_t$. The coefficient α is used to convert the number of wireless terminals into the number of control signals or the number of radio resources used to transmit the control signals. Specifically, the process in step S606 is performed with the multiplex calculator 414 in the cell ID determiner 413.

To simplify the description, α=1, for example, is assumed, and when the process in steps S605 to S607 is completed, $N\#_a=3$,
$N_{\#b}=5$, and
$N_{\#c}=2$ hold. In other words, the $N_t$ is three when the TP is #a, the $N_t$ is five when the TP is #b, and the $N_t$ is two when the TP is #c as illustrated in FIG. 8A.

Figure 9:
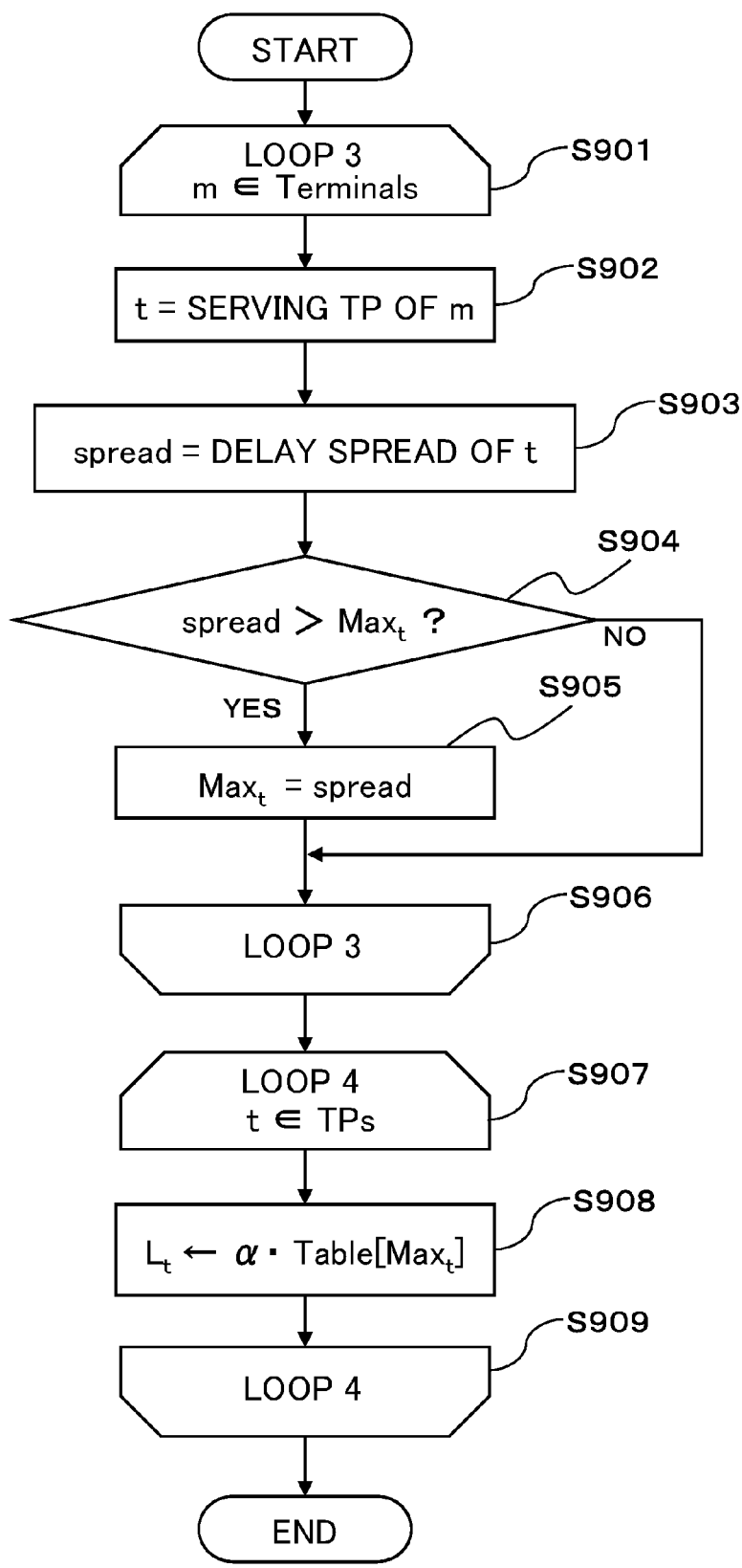
FIG. 9 is a flowchart of a process in which a base station according to an embodiment calculates the information about the number of control signals or the number of radio resources used to transmit the control signals to one or more wireless terminals from the delay spread at each transmission point.

FIG. 9 is a flowchart for a process for calculating the maximum delay spread at each TP in order to calculate the information about the number of control signals from the calculated delay spread. The process of the flowchart illustrated in FIG. 9 is performed with the control signal calculator 412 and the cell ID determiner 413. More specifically, the process of the flowchart illustrated in FIG. 9 is performed with the second control signal calculator 416 in the control signal calculator 412 and the multiplex calculator 414 in the cell ID determiner 413.

When arbitrary one of TPs connected to the base station 101 is t, the variable ranging the maximum values of the delay spread of one or more wireless terminals of which serving TP is t is denoted by $Max_t$. Furthermore, $L_t$ is the variable ranging the number of control signals or the number of radio resources used to transmit the control signals to the one or more wireless terminals calculated from $Max_t$ at t.

The process in steps S901 to S906 of the flowchart illustrated in FIG. 9 is a loop for each wireless terminal that is the elements of Terminals. In other words, the following process is performed for each value of the variable m for which the elements of the Terminals are sequentially substituted with the progress of the loop. The serving TP of m is determined in step S902. The serving TP of m may be determined similarly to the process in step S602 of the flowchart of FIG. 6. In step S903, the delay spread at t is measured and substituted for the variable "spread." The delay spread may be calculated with the delay spread measurer 418. In step S904, it is determined whether the value substituted for the variable spread is larger than the variable $Max_t$. When the value substituted for the variable spread is larger than the variable $Max_t$, the value of the variable spread is substituted for the variable $Max_t$ in step S905. Specifically, the process in steps S902 to S905 is performed with the second control signal calculator 416 in the control signal calculator 412.

When the process in steps S901 to S906 of the flowchart illustrated in FIG. 9 is completed, for example, the variables $Max_t$ are calculated as illustrated in FIG. 8C. In other words, for example, the variables $Max_{\#a}$ are c to d (the variable $Max_{\#a}$ is larger than or equal to c and smaller than d), the variables $Max_{\#b}$ are d to e (the variable $Max_{\#b}$ is larger than or equal to d and smaller than e), and the variables $Max_{\#c}$ are c to d (note that c, d, e are numerical values and the unit is, for example, a microsecond).

The process in steps S907 to S909 of the flowchart illustrated in FIG. 9 is a loop for each TP that is the elements of TPs. The process is for converting the delay spread into the number of control signals or/and the number of radio resources of the control signals. Specifically, the process in step S908 among steps S907 to S909 is performed with the multiplex calculator 414.

In step S908, the value obtained by multiplying Table $[Max_t]$ by the coefficient α is substituted for $L_t$. Note that the Table is a data structure (for example, an array) in which the information about the number of control signals or the number of radio resources used to transmit the control signals is previously linked to the delay spread. As illustrated in FIG. 8B, for example, the delay spread larger than or equal to a and smaller than b is linked to one, the delay spread larger than or equal to b and smaller than c is linked to two, the delay spread larger than or equal to c and smaller than d is linked to three, and the delay spread larger than or equal to d and smaller than e is linked to four in the data structure. Furthermore, the delay spread larger than or equal to e and smaller than f can be linked to five, and the delay spread larger than or equal to f can be linked to six.

Note that the larger the delay spread is, the larger the number of control signals or the number of radio resources used to transmit the control signals is in Table. This is because of the following reason. The larger the delay spread is, the higher the frequency diversity effect is expected. Thus, it is expected that a large number of the wireless terminals are multiplexed in a frequency and in a unit of communication time.

As described above, when α is assumed to be 1 and the process in steps S907 to S909 of the flowchart illustrated in FIG. 9 is completed, with reference to FIGS. 8C and 8B,
$L\#_a=3$,
$L_{\#b}=4$, and
$L_{\#c}=3$
hold as illustrated in FIG. 8D.

Figure 10:
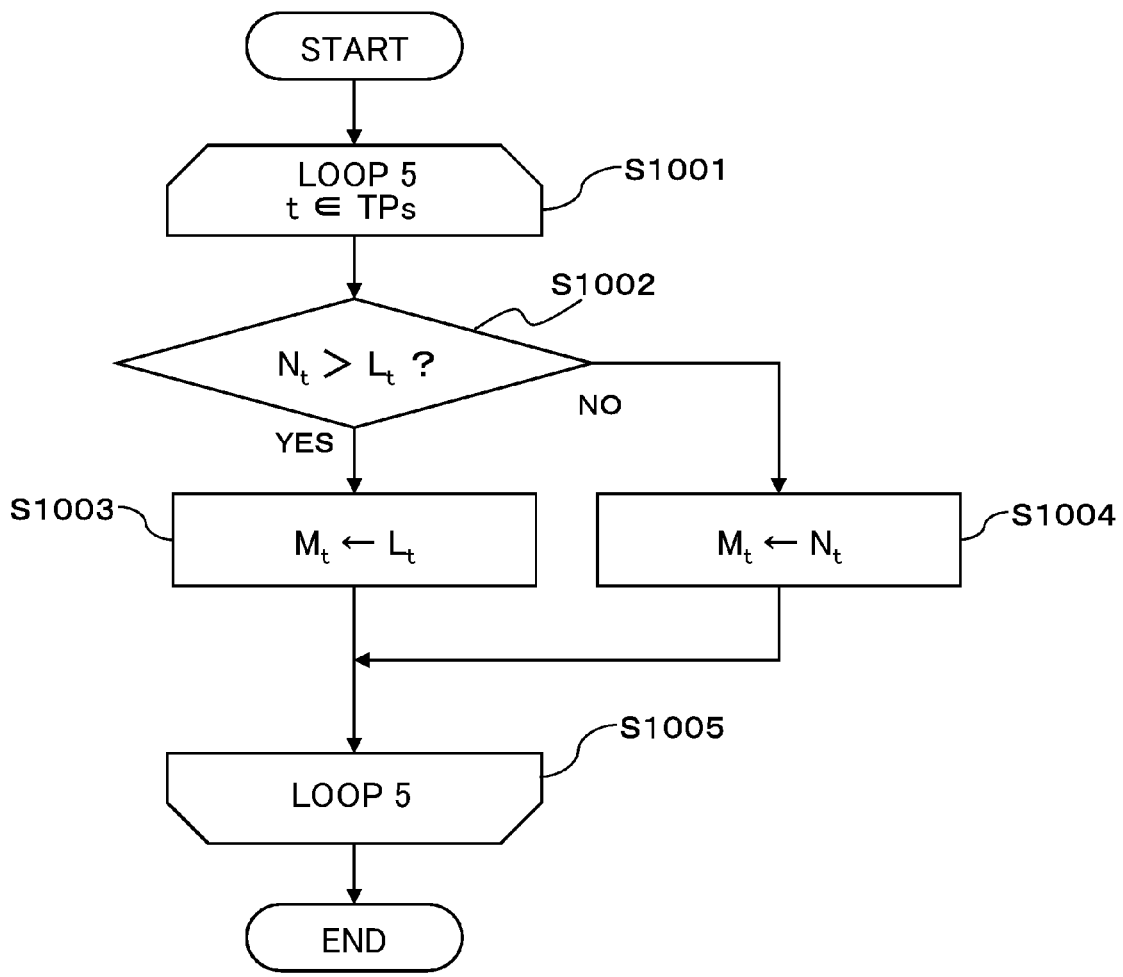
FIG. 10 is a flowchart of a process in which a base station according to an embodiment calculates $M_t$ indicating the number of control signals estimated to actually be transmitted in a unit of communication time at each transmission point or the number of radio resources used to transmit the control signals to one or more wireless terminals based on $N_t$ and $L_t$.

FIG. 10 is a flowchart of a process for calculating $M_t$, which is the maximum value of the number of control signals expected to actually be transmitted at each TP or the number of radio resources used to transmit the control signals based on the variables $N_t$ and $L_t$. In other words, the $M_t$ is the maximum value of the multiplex when the control signals are multiplexed and transmitted to all of the wireless terminals in a cell. The process of the flowchart in FIG. 10 is performed with the cell ID determiner 413. More specifically, the process of the flowchart in FIG. 10 is performed with the multiplex calculator 414.

The process in steps S1001 to S1005 of the flowchart illustrated in FIG. 10 is a loop for the elements of the TPs. In other words, the variable $N_t$ is compared with the variable $L_t$ in step S1002. When $N_t > L_t$ holds, the process goes to step S1003 and the $L_t$ is substituted to $M_t$. When $N_t \leq L_t$ holds, the process goes to step S1004 and the $N_t$ is substituted to $M_t$.

In other words, the $M_t$ is the smaller value of the variables $N_t$ and $L_t$ (when $N_t = L_t$ holds, $N_t$ is substituted to $M_t$, for example). This is because the number corresponding to the number of wireless terminals that can communicate is the upper limit of the number of control signals even when the number of multiplex can be $L_t$ as the transmission environments. On the other hand, even when there are a large number of wireless terminals, it is expected that the number of control signals to be transmitted in a unit of communication time becomes $L_t$ as long as the $L_t$ is the number of multiplex large enough to transmit the control signals as the transmission environments. However, $M_t$ of the present embodiment is not limited to the smaller value of the variables $N_t$ and $L_t$. For example, the $M_t$ can be a value between the variables $N_t$ and $L_t$, or the average value of the variables $N_t$ and $L_t$.

When the process of the flowchart illustrated in FIG. 10 is completed, with reference to FIGS. 8A to 8D, the $M_t$ has the following values
$M\#_a=3$,
$M_{\#b}=4$, and
$M_{\#c}=2$
as illustrated in FIG. 8E.

When the value of $M_t$ is calculated, the cell ID determiner 413 calculates the number of control signals or the number of radio resources used to transmit the control signals when an identical cell ID is installed on adjacent TPs. The calculating process is for calculating sum of $M_t$ at a combination of adjacent TPs. For example, when an identical cell ID is installed on a combination of the TP of #a and the TP of #b, $M_{\#a}+M_{\#b}=3+4=7$ holds. Similarly, when an identical cell ID is installed on a combination of the TP of #b and the TP of #c, $M_{\#b}+M_{\#c}=6$ holds, and when an identical cell ID is installed on a combination of the TP of #c and the TP of #a, $M_{\#c}+M_{\#a}=5$ holds. When an identical cell ID is installed on a combination of three TPs (the TP of #a, the TP of #b, and the TP of #c), $M_{\#a}+M\#_b+M_{\#c}=10$ holds. The table of the results of the above is the example illustrated in FIG. 11.

The radio resources of the TPs are finite. Thus, the number of control signals that a TP can transmit or the number of radio resources used to transmit the control signals to one or more wireless terminals has the maximum value. In the following descriptions, it is assumed that the maximum value of the number of control signals of a cell ID of TP of each of #a to #c or the number of radio resources used to transmit the control signals to the one or more wireless terminals is six. With reference to the example illustrated in FIG. 11, when an identical cell ID is to be installed on the cells #b and #c (the cells #b and #c are merged), or when an identical cell ID is to be installed on the cells #c and #a (the cells #c and #a are merged), the number of control signals or the number of radio resources used to transmit the control signals to the one or more wireless terminals does not exceed six.

Thus, merging the cells #b and #c or merging the cells #c and #a may prevent the shortage of radio resources used to transmit the control signals.

When there is a plurality of combinations of TPs on which an identical cell ID is to be installed, the followings may hold. When the sum of $M_t$ of a combination of TPs is equal to the maximum value of the number of control signals or the number of radio resources used to transmit the control signals to the one or more wireless terminals, the radio resources may efficiently be used. Even when the sum of $M_t$ of a combination of TPs is smaller than the maximum value of the number of control signals or the number of radio resources used to transmit the control signals to the one or more wireless terminals, the radio resources may more efficiently be used as the sum of $M_t$ of a combination of TPs is closer to the maximum value.

Figure 12:
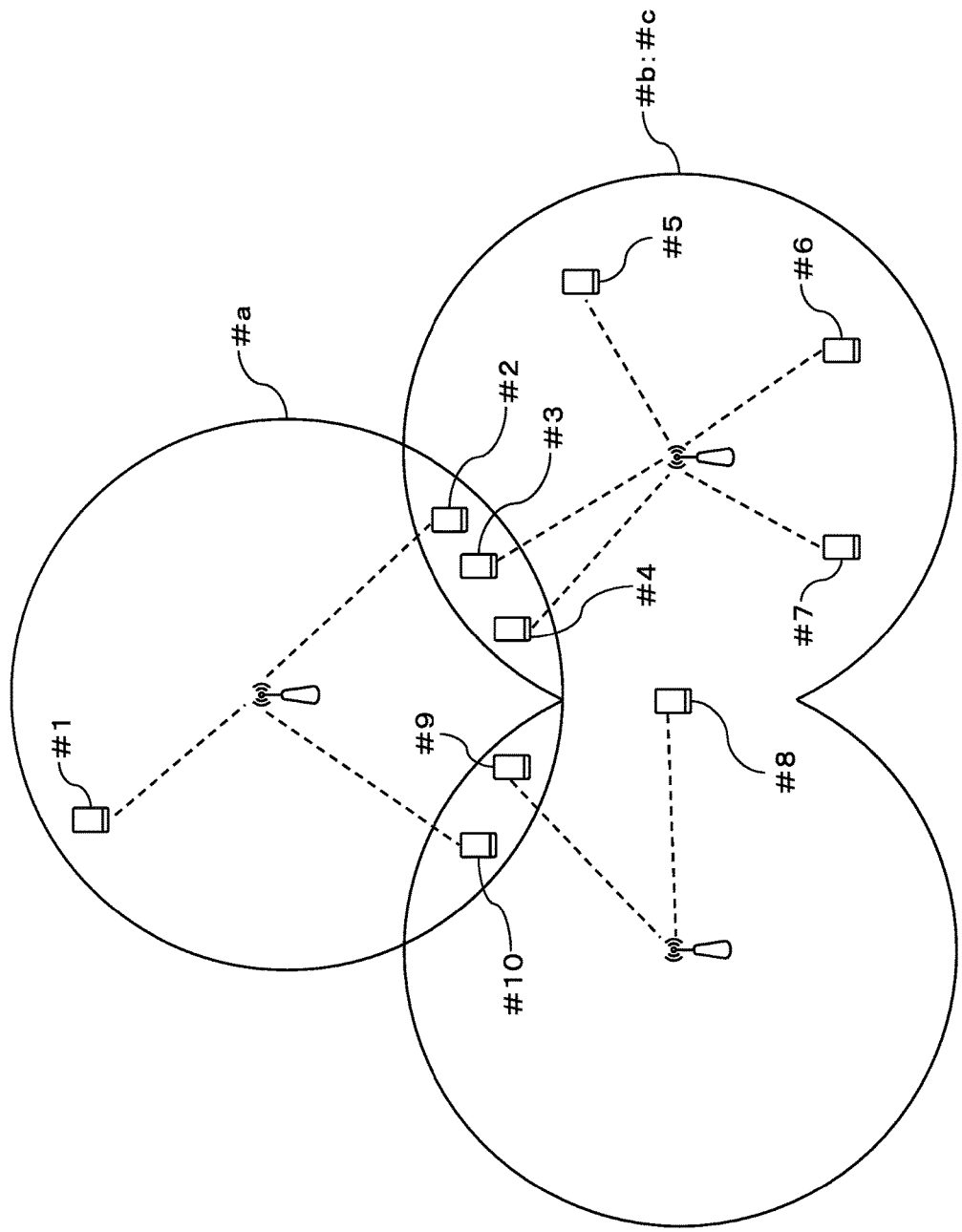
FIG. 12 is a diagram of an example in which an identical identifier is installed on two transmission points in the example illustrated in FIG. 5.

In light of the foregoing, the cell ID determiner 413 selects a combination of TPs in FIG. 11 so that the sum of $M_t$ is six that is the maximum value of the number of control signals or the number of radio resources used to transmit the control signals to the one or more wireless terminals when an identical cell ID is to be installed on adjacent TPs, or so that the sum of $M_t$ is closest to six. Thus, the cells #b and #c illustrated in FIG. 5 are merged as illustrated in FIG. 12. In other words, the radio signal of an identical control signal is transmitted from the TP of #b and the TP of #c. This may improve the efficiency in transmission of control signals or in usage the number of radio resources used to transmit the control signals to the one or more wireless terminals. Meanwhile, the wireless terminal #8 receives the radio signals of the identical control signal from the TP of #b and the TP of #c. This prevents the interference occurring in the cell that the wireless terminal #8 is located.

When an identical cell ID is installed on the TP of #b and the TP of #c, each wireless terminal is connected to the serving TPs and secondary TPs as illustrated in FIG. 13. Note that an identical cell ID installed on the TP of #i and the TP of #j is referred to as "#i:#j" in FIG. 13. The #i:#j=#i or #i:#j=#j may hold. A cell ID different from the cell ID of the #i and #j can be installed as the #i:#j. Installing an identical cell ID on the cell #i and on the cell #j is sometimes referred to as merging the cell #i and the cell #j, or referred to merely as merging #i and #j.

With reference to FIG. 13, a cell ID #b:#c is installed on the cell of #b and the cell of #c. Thus, the cell IDs of secondary TP of the wireless terminal #2, the serving TPs of the wireless terminals #3 to #9, and the secondary TP of the wireless terminal #10 is changed to the cell ID #b:#c.

With reference to FIG. 12, however, when the cells #b and #c are merged and an identical cell ID installed on the merged cells, the wireless terminal #2, the wireless terminal #3, and the wireless terminal #4 receive the interference from the cells #a and #b. Similarly, the wireless terminal #9 and the wireless terminal #10 receive the interference from the cells #c and #a. In other words, the interference between the cells in which the five wireless terminals are located still remains although the merging the cells #b and #c resolves the interference of the cells in which the wireless terminal #8 is located. This remaining interference may be determined also from the fact that five cell IDs #b:#c and #a in total are included in the column of the "secondary TP" in FIG. 13. In light of the foregoing, another selection criterion used in the cell ID determiner 413 to select a combination when there is a plurality of combinations of TPs on which an identical cell ID is to be installed.

FIG. 14 illustrates a result of exemplary calculation of the number of wireless terminals located on the boundary of an merged cell and another cell in addition to the calculation of the sum of $M_t$ of the merged cell. The number of wireless terminals located on the boundary of a merged cell and another cell can be referred to as the number of wireless terminals located both of in the merged cell and in another cell.

When the cells #a and #b of the example illustrated in FIG. 5 are merged, the total number three of the wireless terminal #8, the wireless terminal #9, and the wireless terminal #10, which are located in the cell #a or the cell #b and also located in the cell #c is three that is the number of wireless terminals located on the boundary of the integrated cell #a:#b and the other cell #c. When the cells #b and #c are merged, the total number five of the wireless terminal #2, the wireless terminal #3, the wireless terminal #4, the wireless terminal #9, and the wireless terminal #10 is the number of wireless terminals located on the boundary of the merged cell and the other cell. When the cells #c and #a are merged, the total number four of the wireless terminal #2, the wireless terminal #3, the wireless terminal #4, and the wireless terminal #8 is the number of wireless terminals located on the boundary of the merged cell and the other cell.

For example, when the cells #a and #b are merged, the number of wireless terminals located on the boundary of the merged cell and the other cell #c is the number of rows in which #c is included in the column of the "serving TP" or "secondary TP" in FIG. 7.

The number of wireless terminals located on the boundary of the merged cell and the other cell may be the number of wireless terminals in which the interference of cells occurs after merging cells. Thus, it is preferable that the number of wireless terminals located on the boundary of the merged cell and the other cell is minimum in comparison with that the number of wireless terminals located on the boundary of the integrated cell and the other cell is not minimum.

Figure 15:
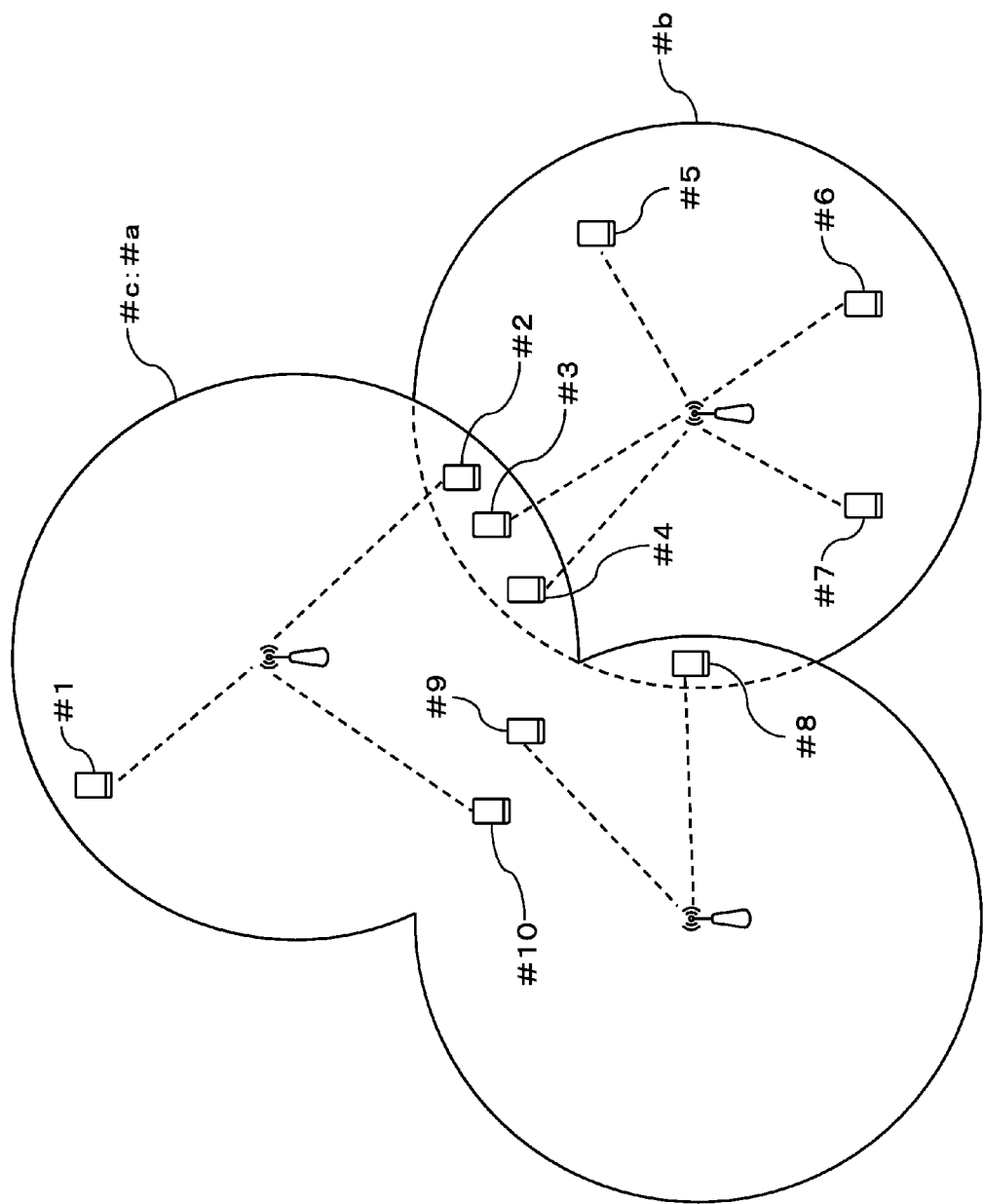
FIG. 15 is a diagram of an exemplary state in which an identical identifier is installed on two transmission points in the example illustrated in FIG. 5.

With reference to FIG. 14, the merged cells #b:#c and #c:#a are the cells in which the sum of $M_t$ is smaller than or equal to six after merging the cells. The merged cell #c:#a is the cell in which the number of wireless terminals located on the boundary of the merged cell and the other cell is minimum. Thus, when the cells #c and #a are merged as illustrated in FIG. 15, the wireless terminal #2, the wireless terminal #3, the wireless terminal #4, and the wireless terminal #8 of which total number is four are located both of in the cell #c:#a and in the cell #b and the number is smaller than the number of wireless terminals located on the boundary of the merged cell and the other cell as illustrated in FIG. 12.

As described above, when the number of control signals transmitted to one or more wireless terminals located in any one of the cells of a plurality of TPs on which different cell IDs are installed is smaller or equal to the threshold, the cell ID controller 401 of the base station 101 according to an embodiment installs an identical cell ID on the TPs. Installation of an identical cell ID on the TPs can prevent occurrence of the interference between the cells. The number of control signals to be transmitted to the one or more wireless terminals located in any one of the cells of the TPs is smaller or equal to the threshold. This may secure the radio resources used to transmit the control signals and thus may prevent the multiplex from decreasing.

Next, a process for installing a different cell ID on one or some of a plurality of TPs on which an identical cell ID is installed will be described. The process is performed when an identical cell ID is installed on a plurality of TPs and the delay spread increases and the number of wireless terminals located in the cell increases.

Figure 16:
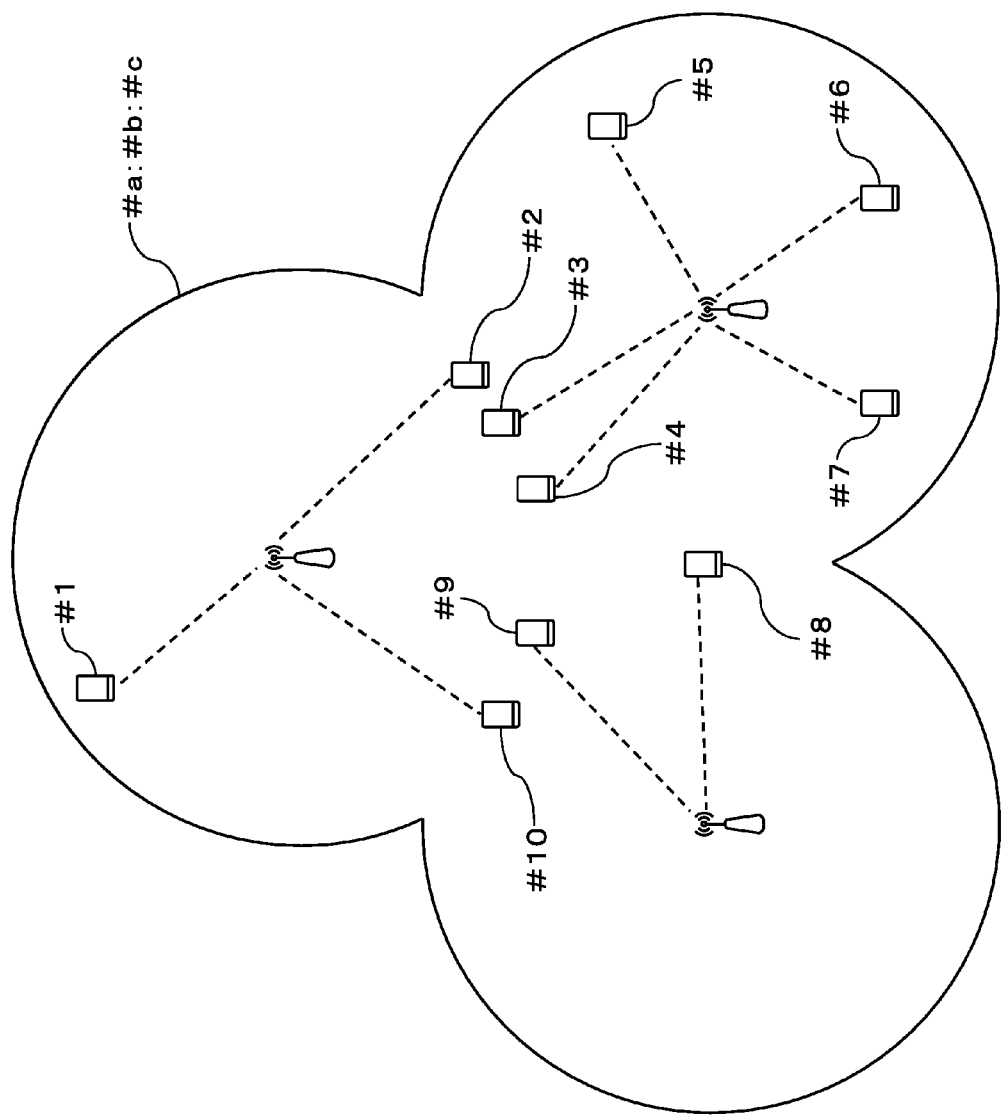
FIG. 16 is a diagram of an exemplary state in which an identical identifier is installed on three transmission points and ten wireless terminals are located in a wireless areas in the example illustrated in FIG. 5.

FIG. 16 illustrates that an identical cell ID is installed on the cells #a, #b, and #c and then the ten wireless terminals #1 to #10 are located in the merged cell #a:#b:#c. The connections between the wireless terminals #1 to #10 and the TPs in the cells #a to #c are indicated by dotted lines. To simplify the description, the connections are identical to the connections in FIG. 5.

The value of $M_t$ in the merged cell #a:#b:#c is 10, which exceeds six that is the maximum value of the number of control signals per cell ID or the number of radio resources used to transmit the control signals to the one or more wireless terminals per cell ID. Thus, it is preferable that a different cell ID is installed on one or more of the cells #a to #c in comparison with the case in which an identical cell ID is kept being installed on the cells #a, #b, and #c.

The values of $M_t$ are seven, six and five, as illustrated in FIG. 14, when different cell IDs are installed on the cells #a:#b and #c, when different cell IDs are installed on the cells #b:#c and #a, and when different cell IDs are installed on the cells #c:#a and #b, respectively. Thus, it is preferable that the cell ID determiner 413 installs different cell IDs on the cells #b:#c and #a or on the cells #c:#a and #b. This is because the value of $M_t$ does not exceeds six.

When the cell IDs #b:#c and #a are installed on the TPs, the number of wireless terminals in which the interference between the cells occurs is larger that the number of wireless terminals in which the interference between the cells occurs when the cell IDs #c:#a and #b are installed on the TPs as described above. Thus, the cell ID determiner 413 determines the cell IDs as #c:#a and #b. In other words, the cell ID determiner 413 determines to remove the cell #b from the cell #a:#b:#c.

Figure 17:
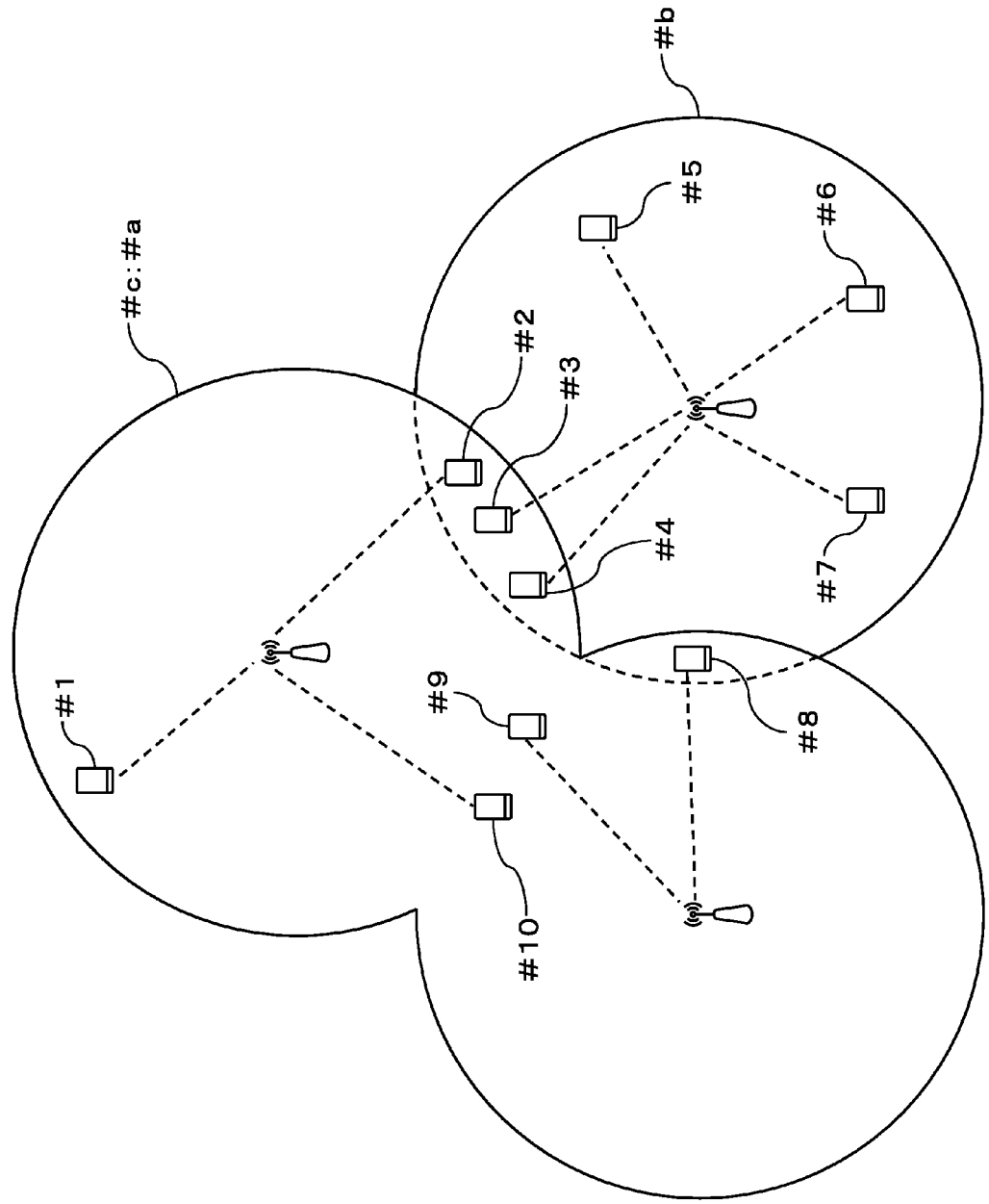
FIG. 17 is a diagram of an exemplary state in which a different identifier is installed on one of the three transmission points in the example of FIG. 16.

As a result of the determination, the wireless terminals #1, #2, and #8 to #10 are connected to the TP of #c:#a and the wireless terminals #3 to #7 are connected to the TP of #b as illustrated in FIG. 17. This connection prevents the interference between the cells in which the wireless terminals #9 and #10 are located, and also prevent the shortage of the radio resources used to transmit the control signals to the wireless terminals and the decrease in multiplex of the signals.

When the number of control signals transmitted to the one or more wireless terminals located in the cell of a plurality of TPs on which an identical cell ID is installed exceeds the threshold, the cell ID controller of the base station according to an embodiment installs a different cell ID on one or some of the TPs as described above. This may make the number of control signals transmitted to the wireless terminals located in the cell of the TPs on which the identical cell ID is installed smaller than or equal to the threshold. This may prevent the shortage of the radio resources used to transmit the control signals to the wireless terminals and the decrease in multiplex of the signals, and also can decrease the interference between the cells in comparison with the prior arts.

Figure 18:
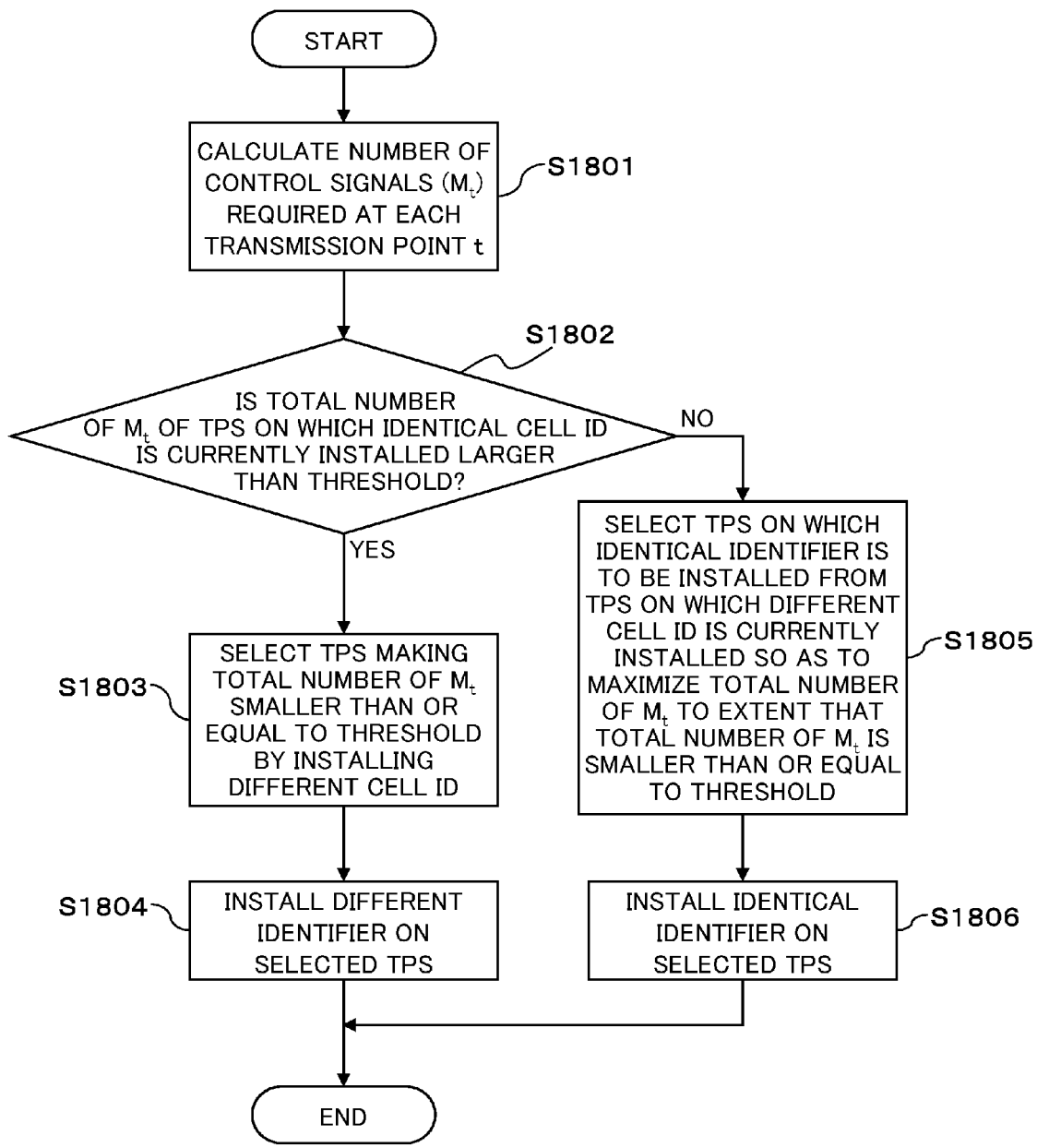
FIG. 18 is a flowchart of a process that the cell ID controller in a base station according to an embodiment performs.

FIG. 18 is a flowchart of a process that the cell ID controller 401 of the base station 101 performs as described above. In step S1801, the number of control signals at each TP or the number of radio resources used to transmit the control signals to the wireless terminals ($M_t$) is calculated. The calculation is performed with the multiplex calculator 414 in accordance with the result of the calculation with the control signal calculator 412. In step S1802, it is determined whether the total number of $M_t$ of TPs on which an identical cell ID is currently installed is larger than the threshold. When the total number of $M_t$ of TPs on which an identical cell ID is currently installed is larger than the threshold, the process goes to the branch of "YES" and the process moves to step S1803. When the total number of $M_t$ of TPs on which an identical cell ID is currently installed is not larger than the threshold, the process goes to the branch of "NO" and the process moves to step S1805.

For example, in FIG. 16 the total number of $M_t$ of TPs in the cell #a:#b:#c is 10, and is larger than the threshold, which is six. The total numbers of $M_t$ of TPs in the cells #a, #b, and #c in FIG. 5 are three, four, and three, respectively, and are smaller than the threshold.

In step S1803 (when the process goes to the branch of "YES" in step S1802), TP that makes the total number of $M_t$ smaller than or equal to the threshold when a different cell ID is installed on the TP is selected. For example, one of the TPs of #a and #b is selected in FIG. 16.

In step S1804, a different cell ID is installed on the selected TP. For example, the cell #b is removed from the cell #a:#b:#c in FIG. 16 and the cells are in the state illustrated in FIG. 17.

On the other hand, in step S1805 (when the process goes to the branch of "NO" in step S1802), TPs on which an identical cell ID to be installed are selected from the TPs on which different cell IDs are currently installed so that the total number of $M_t$ is maximized to an extent that the total number of $M_t$ is smaller than or equal to the threshold. For example, the TPs of the cells #b and #c or the TPs of the cells #c and #a in FIG. 5 are selected as illustrated in FIG. 11.

In step S1806, an identical cell ID is installed on the selected TPs. For example, an identical cell ID is installed on the cells #b and #c.

Figure 19:
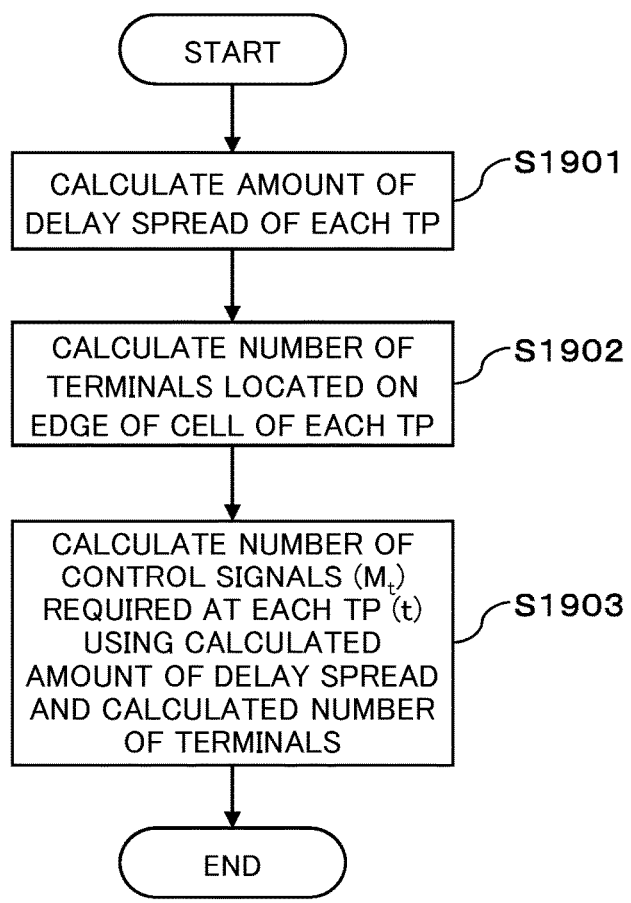
FIG. 19 is a flowchart of a process in which a base station according to an embodiment calculates the number of control signals at each transmission point or the number of radio resources used to transmit the control signals to one or more wireless terminals.

FIG. 19 is a flowchart of a process in step S1801 in FIG. 18 for calculating the number of control signals at each TP or the number of radio resources used to transmit the control signals to the one or more wireless terminals. In step S1901, the amount of delay spread at each TP is calculated. In step S1902, the number of wireless terminals located on the edge of the cell of each TP is calculated. In step S1903, the number of control signals at each TP or the number of radio resources used to transmit the control signals to the one or more wireless terminals ($M_t$) is calculated with the results of the calculation of the calculated delay spread and the calculated number of wireless terminals.

Note that the order in which the processes in step S1901 and step S1902 are performed is not limited to the order illustrated in FIG. 19, and the processes can be performed in the inverse order.

Figure 20:
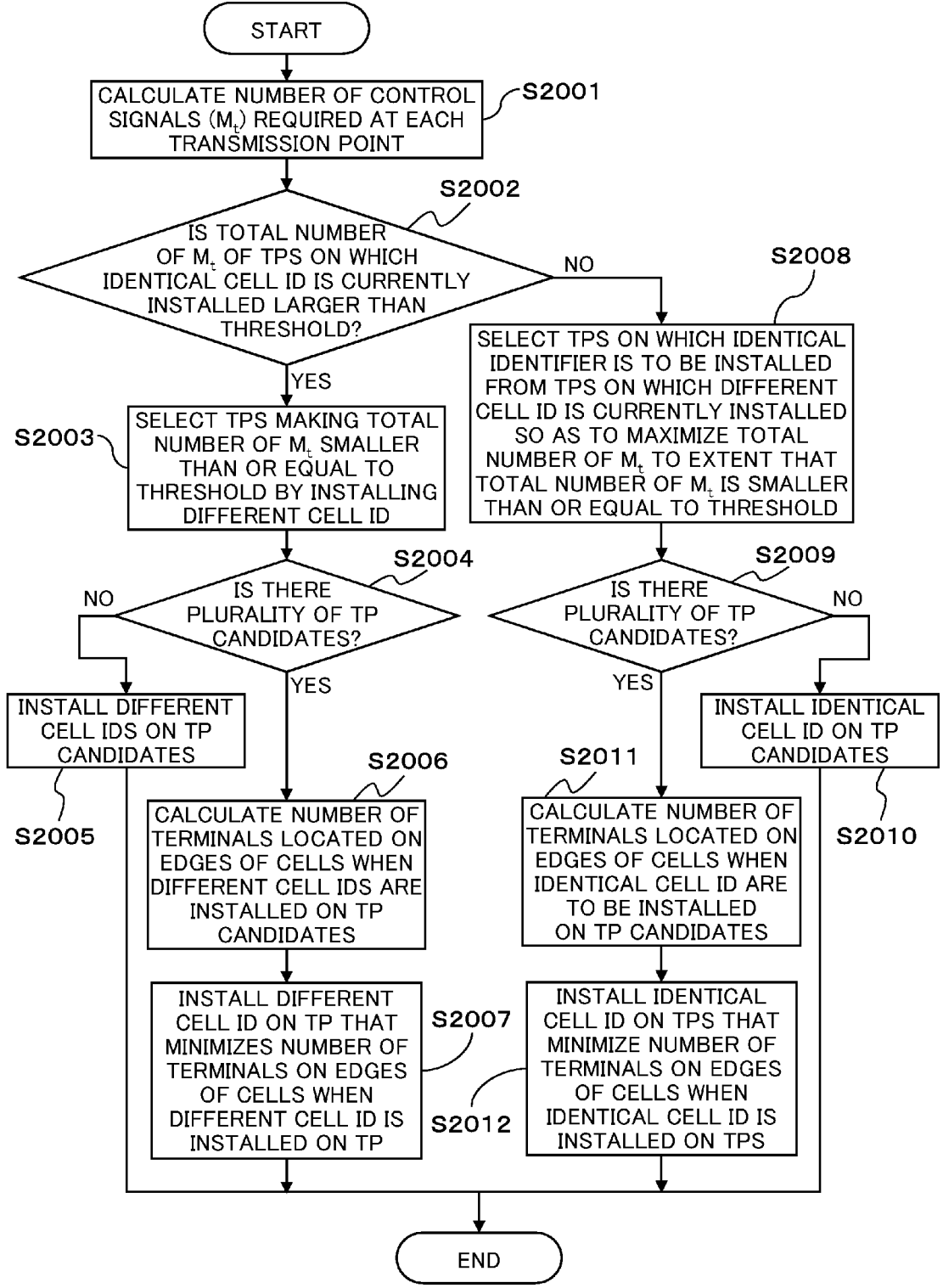
FIG. 20 is a flowchart of a process that the base station according to an embodiment in FIG. 18 performs when a plurality of transmission points may be selected.

FIG. 20 is a flowchart of a process performed when a plurality of combinations of TPs may be selected in at least one of steps S1803 and S1805 in FIG. 18.

Similarly to step S1801, the number of control signals at each TP or the number of radio resources used to transmit the control signals to the one or more wireless terminals ($M_t$) is calculated in step S2001. In step S2002, it is determined whether the total number of $M_t$ at TPs on which an identical cell ID is currently installed is larger than the threshold. When the total number of $M_t$ at the TPs on which an identical cell ID is currently installed is larger than the threshold, the process goes to the branch of "YES" and the process moves to step S2003. When the total number of $M_t$ at the TPs on which an identical cell ID is currently installed is not larger than the threshold, the process goes to the branch of "NO" and the process moves to step S2008.

In step S2003 (when the process goes to the branch of "YES" in step S2002), a TP that makes the total number of $M_t$ smaller than or equal to the threshold when a different cell ID is installed on the TP is selected, similarly to step S1803.

In step S2004, the TP selected in step S2003 are removed from the identical cell ID (a different cell ID is installed on the selected TP). Then, it is determined whether there is a plurality of TP candidates to make the total number of $M_t$ smaller than or equal to the threshold. When there is not a plurality of TP candidates that make the total number of $M_t$ smaller than or equal to the threshold when the selected TP is removed from the identical cell ID, the process goes to the branch of "NO" and the process moves to step S2005. When there is a plurality of TP candidates that make the total number of $M_t$ smaller than or equal to the threshold when each of the TPs is removed from the identical cell ID, the process moves to step S2006.

In step S2005 (when the process goes to the branch of "NO" in step S2004), a different cell ID is installed on the selected TP, similarly to step S1804.

In step S2006 (when the process goes to the branch of "YES" in step S2004), a different cell ID is installed on each of the TP candidates in order to calculate the number of wireless terminals on the edge of the cell when the cell is removed from the identical cell ID. For example, the TP edge communication terminal number calculator 411 calculates the values in the column "$M_t$ on the boundary with another cell" illustrated in FIG. 14.

In step S2007, the TP that minimizes the number of wireless terminals on the boundary of the cells is removed from the identical cell ID. For example, removing the #b from the cell #a:#b:#c in FIG. 14 minimizes the number of wireless terminals on the boundary of the cell IDs. Thus, the #b is removed from the cell ID #a:#b:#c.

In step S2008 (when the process goes to the branch of "NO" in step S2002), the process similar to the process in step S1805 is performed. In step S2008, TPs on which an identical cell ID to be installed are selected from the TPs on which different cell IDs are currently installed so that the total number of $M_t$ is maximized to an extent that the total number of $M_t$ is smaller than or equal to the threshold.

In step S2009, as a result of the process in step S2008, it is determined whether there is a plurality of TPs on which an identical cell ID is to be installed and which are selected from the TPs on which different cell IDs are currently installed so that the total number of $M_t$ is maximized to an extent that the total number of $M_t$ is smaller than or equal to the threshold. When there is a plurality of TPs on which an identical cell ID is to be installed and which are selected from the TPs on which different cell IDs are currently installed so that the total number of $M_t$ is maximized to an extent that the total number of $M_t$ is smaller than or equal to the threshold, the process goes to the branch of "YES" and the process moves to step S2011. When there is not a plurality of TPs on which an identical cell ID to be installed and which are selected from the TPs on which different cell IDs are currently installed so that the total number of $M_t$ is maximized to an extent that the total number of $M_t$ is smaller than or equal to the threshold, the process goes to the branch of "NO" and the process moves to step S2010.

In step S2011 (when the process goes to the branch of "YES" in step S2009), the number of wireless terminals located on the boundary of the cells of the TP candidates on which an identical cell ID is to be installed. For example, the TP edge communication terminal number calculator 411 calculates the values in the column "$M_t$ on the boundary with another cell" illustrated in FIG. 14.

In step S2012, an identical cell ID is installed on the TPs that minimize the number of wireless terminals located on the boundary of the cells.

In step S2010 (when the process goes to "NO" in step S2009), an identical cell ID is installed on the selected TPs.

Figure 21:
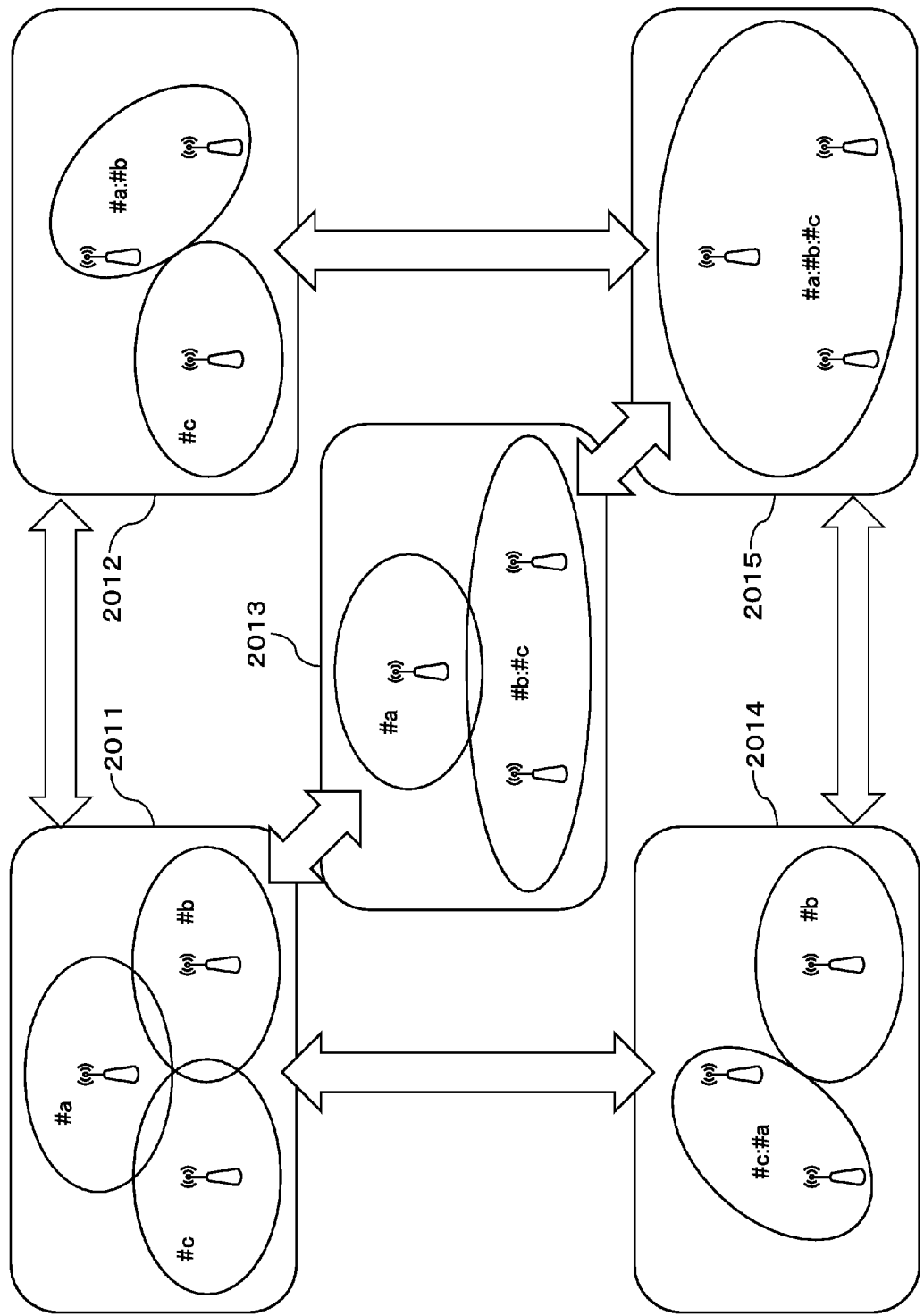
FIG. 21 is a diagram of the transition among the states in which an identical identifier is installed on the transmission points and in which different identifiers are installed on the transmission points when the transmission points are adjacent to each other.

FIG. 21 is a diagram of exemplary transition of the cell IDs when the cells #a to #c are adjacent to each other. Different cell IDs are installed on the cells #a to #c in state 2011. When the sum of the numbers of control signals at the TP of #a and the TP of #b or the sum of the numbers of radio resources used to transmit the control signals to one or more wireless terminals at the TP of #a and the TP of #b is smaller than the threshold, the state moves to state 2012 and the cells #a and #b are merged.

When the sum of the numbers of control signals at the TP of #b and the TP of #c or the sum of the numbers of radio resources used to transmit the control signals to the one or more wireless terminals at the TP of #b and the TP of #c is smaller than the threshold in the state 2011, the state moves to state 2013 and the cells #b and #c are merged.

When the sum of the numbers of control signals at the TP of #c and the TP of #a or the sum of the numbers of radio resources used to transmit the control signals to the one or more wireless terminals is smaller than the threshold in the state 2011, the state moves to a state 2014 and the cells #c and #a are merged.

When the sum of the numbers of control signals at the TPs of #a to #c or the sum of the numbers of radio resources used to transmit the control signals to the one or more wireless terminals at the TPs of #a to #c is smaller than a predetermined threshold in any one of the states 2012, 2013, and 2014, the state moves to state 2015 and the cells #a to #c are merged. The predetermined threshold may be the maximum value of the number of control signals or the number of radio resources used to transmit the control signals to the one or more wireless terminals.

The transition of the states is reversible. For example, when the sum of the number of control signals at the TP of #a:#b or the sum of the number of radio resources used to transmit the control signals to the one or more wireless terminals at the TP of #a:#b is larger than or equal to the threshold in the state 2012, different cell IDs are installed on the cells #a and #b and the state moves to the state 2011. When the sum of the number of control signals at the TP of #b:#c or the sum of the number of radio resources used to transmit the control signals to the one or more wireless terminals at the TP of #b:#c is larger than or equal to the threshold in the state 2013, different cell IDs are installed on the cells #b and #c and the state moves to the state 2011. When the sum of the number of control signals at the TP of #c: #a or the sum of the number of radio resources used to transmit the control signals to the one or more wireless terminals at the TP of #c:#a is larger than or equal to the threshold in the state 2014, different cell IDs are installed on the cells #c and #a to move the state to the state 2011.

When the sum of the number of control signals or the sum of the number of radio resources used to transmit the control signals to the one or more wireless terminals is larger than or equal to the threshold in the state 2015, the state moves to any one of the states 2012, 2013, and 2014. It is determined to which state 2012, 2013, or 2014 the state moves depending on whether the sum of the numbers of control signals at the TPs of #a and #b, #b and #c, and #c and #a or the sum of the numbers of radio resources used to transmit the control signals to the one or more wireless terminals at the TPs of #a and #b, #b and #c, and #c and #a is smaller than the threshold. The determination sometimes depends on the number of wireless terminals on the cell edges.

Figure 22:
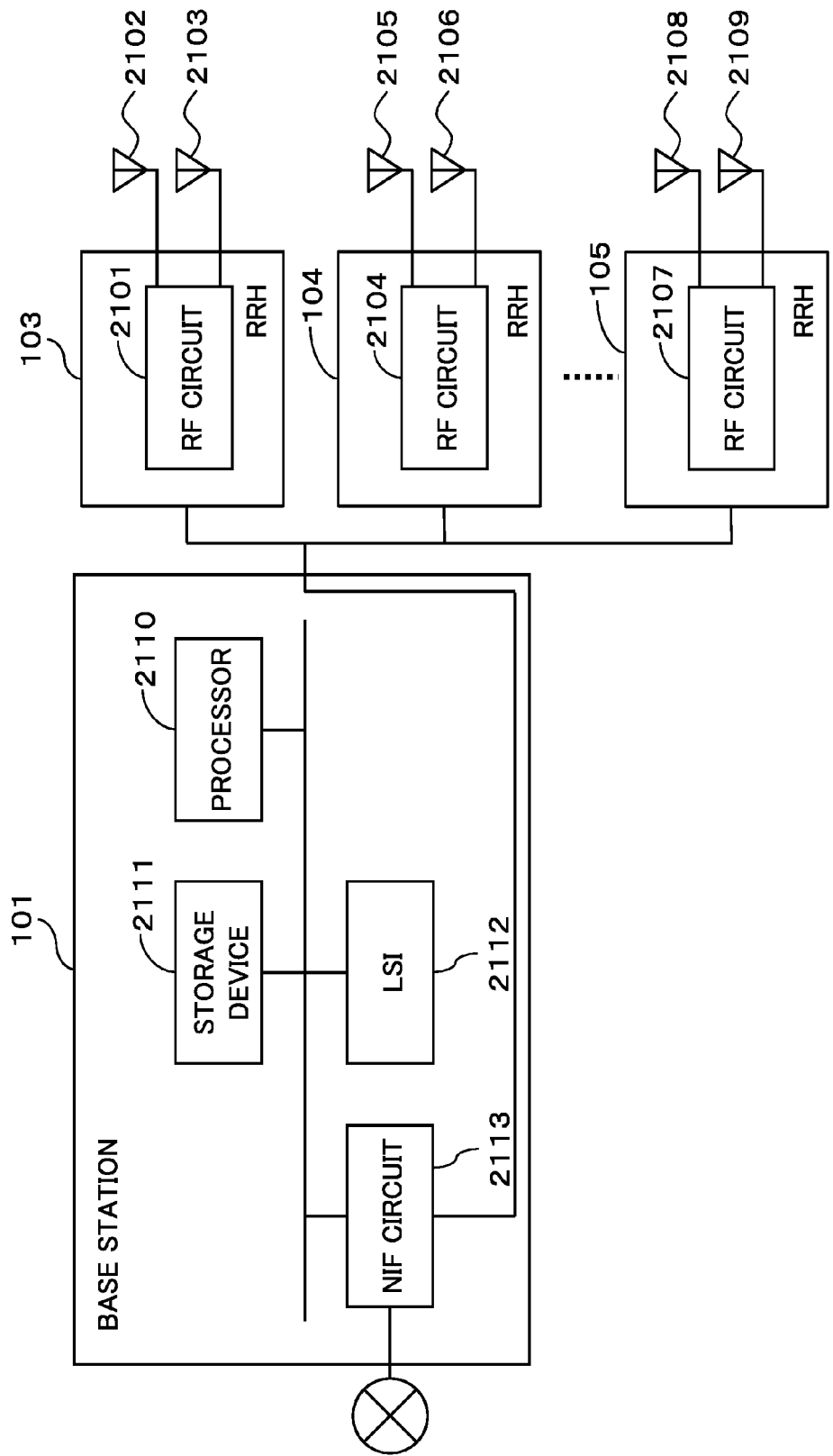
FIG. 22 is a diagram of a hardware configuration of a base station according to an embodiment.

FIG. 22 is a diagram of the hardware configuration of the base station 101 and TPs 103 to 104. The base station 101 includes a processor 2110, a storage device 2111, a Large Scale Integrated circuit (LSI) 2112, and a Network Interface (NIF) circuit 2113. The NIF circuit 2113 corresponds to the network I/F 423 and the TP I/F 421 in FIG. 4. The LSI 2112 is, for example, a signal processing processor and hardware corresponding to the BBU 422.

The storage device 2111 is a non-volatile storage device such as a hard disk or a Solid State Drive (SSD) or a volatile storage device such as a Dynamic Random Access Memory (DRAM). The storage device 2111 stores a program executed by the processor 2110 and various setting parameters. The storage device 2111 provides a temporal work area when the processor 2110 executes a program.

The processor 2110 is, for example, a Central Processing Unit (CPU) and executes a program stored in the storage device 2111. For example, a program executed by the processor 2110 implement the operation of the cell ID controller 401. A process of a device driver for the NIF circuit 2113 and the LSI 2112 is performed so that data is input and output between the NIF circuit 2113 and the LSI 2112 and the processor 2110.

Note that the processor 2110 of the base station 101 can have the configuration without using a program by using a Field Gate Programmable Array (FPGA), instead of the configuration to execute a program.

RRHs 103, 104, and 105 includes RF circuits 2101, 2104, and 2107, respectively. Antennas 2102 and 2103, 2105 and 2106, and 2108 and 2109 are connected to the RF circuits 2101, 2104, and 2107, respectively. The RF circuits 2101, 2104, and 2107 are connected to the BBU 422 via the TP I/F 421 of the base station 101 so as to convert the frequencies between the baseband signals and the signals transmitted and received with the antennas 2102, 2103, 2105, 2106, 2108, and 2109.

Comparison Example

The selection between the operation in the identical cell ID scheme and the operation in the individual cell ID scheme in accordance with the number of control signals or the number of radio resources used to transmit the control signals to one or more wireless terminals has been described in the embodiments. As a comparison example of another selection criterion, the selection between the operation in the identical cell ID scheme and the operation in the individual cell ID scheme in accordance with the number of wireless terminals on the cell edges is considered below. The aim of the selection of the comparison example is that the identical cell ID scheme is used when a large number of wireless terminals are located on the cell edges in order to prevent the decrease in transmission efficiency due to frequent handover by wireless terminals located on the cell edge.

Figure 23B:
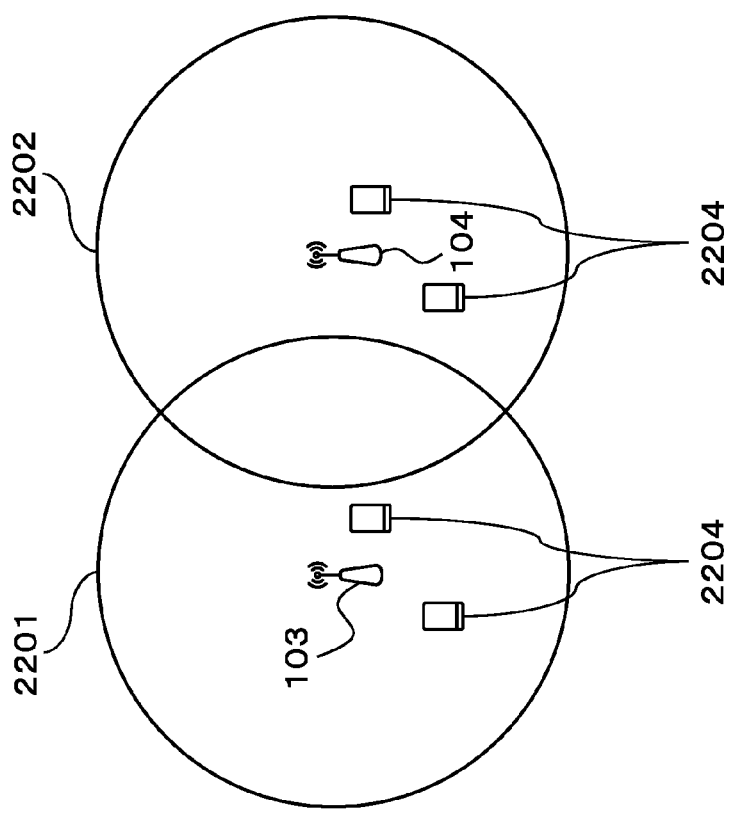
FIG. 23B is an explanatory diagram of exemplary difference between the operation according to an embodiment and the operation of a comparison example in which the number of wireless terminals on the edges of the wireless areas decreases.
Figure 23A:
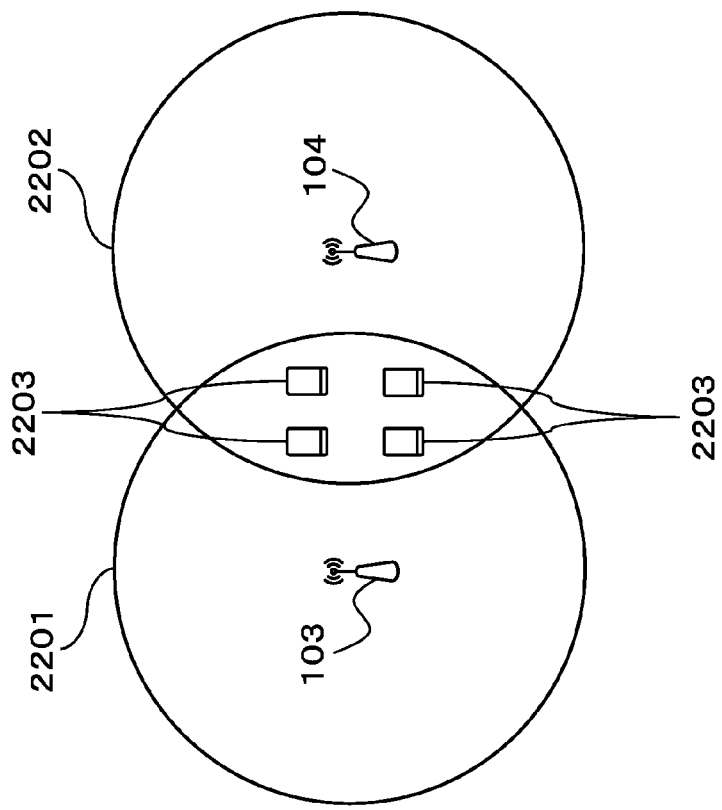
FIG. 23A is an explanatory diagram of exemplary difference between the operation according to an embodiment and the operation of a comparison example in which the number of wireless terminals on the edges of the wireless areas increases.

For example, on the assumption that the TP 103 forms the cell 2201, the TP 104 forms the cell 2202, and a large number of wireless terminals 2203 are located both of in the cell 2201 and in the cell 2202 as illustrated in FIG. 23A, an identical cell ID is installed on the cell 2201 and the cell 2202 in the comparison example.

Thus, when the number of wireless terminals 2203 located both of in the cell 2201 and in the cell 2202 increases, the number of control signals or the radio resources exceeds the number of control signals or the radio resources that the TP 103 and the TP 104 can transmit.

On the other hand, the embodiment controls whether an identical cell ID is installed on the cells in accordance with the number of control signals or the number of radio resources used to transmit the control signals to one or more wireless terminals. Thus, an identical cell ID is not installed on the cell 2201 and the cell 2202 in some cases even when a large number of wireless terminals 2203 are located both of in the cell 2201 and in the cell 2202. Thus, with the comparison example, the number of control signals or the radio resource does not frequently exceed the number of control signals or the radio resources that the TP 103 and the TP 104 can transmit in the embodiment in comparison. Thus, the radio resources may more efficiently be used in the embodiment than in the comparison example.

Similarly to FIG. 23A, the TP 103 forms the cell 2201 and the TP 104 forms the cell 2202 in FIG. 23B. However, the wireless terminals 2204 are located in one of the cell 2201 and in the cell 2202. In other words, there is no wireless terminal 2204 located both of in the cell 2201 and in the cell 2202 or there are a small number of wireless terminals 2204 located both of in the cell 2201 and in the cell 2202. In such a case, an identical cell ID is not installed on the cell 2201 and the cell 2202 in the comparison example.

On the other hand, the embodiment controls whether an identical cell ID is to be installed on the cells in accordance with the number of control signals or the number of radio resources used to transmit the control signals to the one or more wireless terminals. In other words, when the number of control signals or the number of radio resources used to transmit the control signals to the one or more wireless terminals is smaller than or equal to the threshold, an identical cell ID is installed on the TP 103 and the TP 104. This may increase the efficiency in usage of the radio resources and prevent the interference between the cells in comparison with the comparison example.

According to an aspect of an embodiment, the amount of traffic handled in a wireless area can be increased while the interference between the transmission points is prevented.

All examples and conditional languages recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions and alterations could be made hereto without departing from the spirit and scope of the invention.

What is claimed is:

1. A base station comprising:
a memory; and
a processor coupled to the memory,
wherein the processor is configured to control one or more identifiers to be installed on a plurality of transmission points in accordance with a number of control signals transmitted from the transmission points to one or more wireless terminals or a number of radio resources used to transmit the control signals to the one or more wireless terminals.

2. The base station according to claim 1, wherein the processor is configured to install an identical identifier on two or more transmission points on which different Identifiers are installed among the transmission points, when the number of control signals transmitted to one or more wireless terminals located in wireless areas of the two or more transmission points on which the different identifiers are installed or the number of radio resources used to transmit the control signals to the one or more wireless terminals is smaller than a threshold.

3. The base station according to claim 2, wherein the processor is configured to select a combination of the two or more transmission points to minimize the number of wireless terminals located both of in a wireless area of the two or more transmission points on which an Identical identifier is to be Installed, and in a wireless area of a transmission point on which an identifier different from the identical identifier is installed, when there is a plurality of combinations of the two or more transmission points on which the identical identifier is to be installed.

4. The base station according to claim 2, wherein the processor is configured to select a combination of the two or more transmission points in which the number of control signals transmitted to one or more wireless terminals located in wireless areas of the two or more transmission points on which the Identical identifier is to be installed or the number of radio resources used to transmit the control signals is equal to the threshold, or a combination of the two or more transmission points in which the number of control signals or the number of radio resources is closest to the threshold when there is a plurality of combinations of the two or more transmission points on which the Identical identifier is to be Installed.

5. The base station according to claim 1, wherein the processor is configured to install a different identifier on a part of two or more transmission points on which an identical Identifier is installed, when the number of control signals transmitted to the one or more wireless terminals located in wireless areas of the two or more transmission points on which the identical identifier is installed or the number of radio resources used to transmit the control signals is larger than or equal to a threshold.

6. The base station according to claim 5, wherein the processor is configured to select a combination of transmission points to minimize the number of wireless terminals located both in a wireless area of the part on which the different identifier is installed and in a wireless area of a transmission point on which an identifier other than the different Identifier is installed, when there is a plurality of transmission points in the part of the two or more transmission points on which the identical identifier is installed.

7. The base station according to claim 1, wherein the processor is configured to calculate the number of control signals or the number of radio resources used to transmit the control signals in accordance with the number of wireless terminals located in a wireless area and a delay spread of a signal that the one or more wireless terminals receive from the plurality of transmission points.

8. A wireless communication system comprising:
a base station connected to a plurality of transmission points;
one or more wireless terminals configured to communicate with at least one of the transmission points; and
a controller configured to control one or more Identifiers to be installed on the transmission points in accordance with a number of control signals transmitted from the transmission points to the one or more wireless terminals or a number of radio resources used to transmit the control signals to the one or more wireless terminals.

9. The wireless communication system according to claim 8, wherein the controller is configured to install an identical identifier on two or more transmission points on which different identifiers are installed among the transmission points when the number of control signals transmitted to the one or more wireless terminals located in wireless areas of the two or more transmission points on which the different identifiers are installed or the number of radio resources used to transmit the control signals to the one or more wireless terminals is smaller than a threshold.

10. The wireless communication system according to claim 9, wherein the controller is configured to select a combination of the two or more transmission points to minimize the number of wireless terminals located both of in a wireless area of the two or more transmission points on which an identical identifier is to be installed, and in a wireless area of a transmission point on which an Identifier different from the identical identifier is installed, when there is a plurality of combinations of the two or more transmission points on which the identical identifier is installed.

11. The wireless communication system according to claim 9, wherein the controller is configured to select a combination of the two or more transmission points in which the number of control signals transmitted to the one or more wireless terminals located in wireless areas of the two or more transmission points on which the identical identifier is to be installed or the number of radio resources used to transmit the control signals is equal to the threshold, or a combination of the two or more transmission points in which the number of control signals or the number of radio resources is closest to the threshold when there is a plurality of combinations of the two or more transmission points on which the identical identifier is to be installed.

12. The wireless communication system according to claim 8, wherein the controller is configured to install a different identifier on a part of two or more transmission points on which the identical identifier is installed when the number of control signals transmitted to the one or more wireless terminals located in wireless areas of the two or more transmission points on which the identical identifier is Installed or the number of radio resources used to transmit the control signals is larger than or equal to a threshold.

13. The wireless communication system according to claim 12, wherein the controller is configured to select a combination of transmission points to minimize the number of wireless terminals located both in a wireless area of the part on which the different identifier is installed and in a wireless area of a transmission point on which an identifier other than the different identifier is installed, when there is a plurality of transmission points in the part of the two or more transmission points on which the identical identifier is installed.

14. A base station processing method, the method comprising:
controlling one or more identifiers to be installed on a plurality of transmission points in accordance with a number of control signals transmitted from the transmission points to one or more wireless terminals or a number of radio resources used to transmit the control signals to the one or more wireless terminals.

15. The base station processing method according to claim 14, the method further comprising:
installing an identical identifier on two or more transmission points on which different identifiers are to be installed among the transmission points, when the number of control signals transmitted to one or more wireless terminals located in wireless areas of the two or more transmission points on which the different identifiers are installed or the number of radio resources used to transmit the control signals to the one or more wireless terminals is smaller than a threshold.

16. The base station processing method according to claim 15, the method further comprising:
selecting a combination of the two or more transmission points to minimize the number of wireless terminals located both of in a wireless area of the two or more transmission points on which identical types of identifier are to be installed, and in a wireless area of a transmission point on which an identifier different from the identical identifier is Installed, when there is a plurality of combinations of the two or more transmission points on which the identical identifier is to be installed.

17. The base station processing method according to claim 15, the method further comprising:

selecting a combination of the two or more transmission points in which the number of control signals transmitted to one or more wireless terminals located in wireless areas of the two or more transmission points on which the identical identifier is to be installed or the number of radio resources used to transmit the control signals is equal to the threshold, or a combination of the two or more transmission points in which the number of control signals or the number of radio resources is closest to the threshold when there is a plurality of combinations of the two or more transmission points on which the identical identifier is to be installed.

18. The base station processing method according to claim 14, the method further comprising:

installing a different identifier on a part of two or more transmission points on which an identical identifier is installed, when the number of control signals transmitted to one or more wireless terminals located in wireless areas of the two or more transmission points on which the identical identifier is installed or the number of radio resources used to transmit the control signals to the one or more wireless terminals is larger than or equal to a threshold.

19. The base station processing method according to claim 18, the method further comprising:

selecting a combination of transmission points to minimize the number of wireless terminals located both in a wireless area of the first part on which the different identifier is installed and in a wireless area of a transmission point on which an identifier other than the different identifier is installed when there is a plurality of transmission points in the part of the two or more transmission points on which the identical identifier is installed.

20. The base station processing method according to claim 14, the method further comprising:

calculating the number of control signals or the number of radio resources used to transmit the control signals in accordance with the number of wireless terminals located in a wireless area and a delay spread of a signal that the one or more wireless terminals receives from the plurality of transmission points.

* * * * *